US010671520B1

(12) United States Patent
Rodrigues et al.

(10) Patent No.: US 10,671,520 B1
(45) Date of Patent: *Jun. 2, 2020

(54) SCHEDULED TESTS FOR ENDPOINT AGENTS

(71) Applicant: ThousandEyes, Inc., San Francisco, CA (US)

(72) Inventors: Nelson Rodrigues, San Francisco, CA (US); Santiago Alessandri, San Francisco, CA (US); Sergio Freitas, London (GB); Ricardo V. Oliveira, San Francisco, CA (US)

(73) Assignee: ThousandEyes, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,247

(22) Filed: Jul. 31, 2019

Related U.S. Application Data

(63) Continuation-in-part of application No. 15/622,535, filed on Jun. 14, 2017.

(Continued)

(51) Int. Cl.
*G06F 15/173* (2006.01)
*G06F 11/36* (2006.01)
*H04L 12/26* (2006.01)

(52) U.S. Cl.
CPC ...... *G06F 11/3688* (2013.01); *G06F 11/3692* (2013.01); *H04L 43/08* (2013.01); *H04L 43/50* (2013.01)

(58) Field of Classification Search
CPC ......... G06F 8/60; H04L 41/046; H04L 41/22; H04L 43/045; H04L 43/06; H04L 43/12; H04L 43/50; H04L 67/10

(Continued)

(56) References Cited

U.S. PATENT DOCUMENTS 5,655,081 A 8/1997 Bonnell
5,881,237 A 3/1999 Schwaller
(Continued)

FOREIGN PATENT DOCUMENTS

CN 100388695 11/2006
EP 2222025 8/2010
(Continued)

OTHER PUBLICATIONS

Author Unknown, BGPlay @ Route Views, Apr. 14, 2015 retrieved from https://web.archive.org/web/20150414123115/http://bgplay.routeviews.org/main.html.
(Continued)

*Primary Examiner* — Liang Che A Wang
(74) *Attorney, Agent, or Firm* — Van Pelt, Yi & James LLP

(57) ABSTRACT

Techniques for scheduled tests for endpoint agents are disclosed. In some embodiments, a system/process/computer program product for providing scheduled tests for endpoint agents includes receiving a test configuration for scheduled tests that includes a set of conditions for dynamically selecting endpoint agents that match the set of conditions in the test configuration, wherein a plurality of endpoint agents are deployed to a plurality of endpoint devices; identifying one or more of the plurality of endpoint agents that match the set of conditions in the test configuration; assigning the scheduled tests associated with the test configuration to the matching endpoint agents for execution of the scheduled tests based on the test configuration, wherein test results are based on the scheduled tests executed on each of the matching endpoint agents for monitoring network activity; and receiving uploaded results of the scheduled tests executed on the matching endpoint agents, wherein the uploaded results of the scheduled tests executed on the (Continued)

matching endpoint agents are processed for generating graphical visualizations and/or alerts of the monitored network activity.

23 Claims, 25 Drawing Sheets

Related U.S. Application Data

(60) Provisional application No. 62/350,632, filed on Jun. 15, 2016.
(58) Field of Classification Search
USPC .............................. 709/201, 202, 223, 224
See application file for complete search history.

(56) References Cited

U.S. PATENT DOCUMENTS

| | | |
|---|---|---|
| 5,940,376 A | 8/1999 | Yanacek |
| 6,397,359 B1 | 5/2002 | Chandra |
| 6,611,955 B1 | 8/2003 | Logean |
| 6,625,648 B1 | 9/2003 | Schwaller |
| 6,744,739 B2 | 6/2004 | Martin |
| 6,892,227 B1 | 5/2005 | Elwell |
| 6,993,686 B1* | 1/2006 | Groenendaal ....... G06F 11/2023 709/224 |
| 7,209,963 B2 | 4/2007 | Burton |
| 7,231,555 B2 | 6/2007 | Barnard |
| 7,240,325 B2* | 7/2007 | Keller ................. G06F 9/5061 717/104 |
| 7,299,277 B1 | 11/2007 | Moran |
| 7,423,979 B2 | 9/2008 | Martin |
| 7,487,240 B2 | 2/2009 | Proulx |
| 7,529,192 B2 | 5/2009 | Labovitz |
| 7,616,579 B2 | 11/2009 | Pittelli |
| 7,636,305 B1 | 12/2009 | Taylor |
| 7,660,290 B2 | 2/2010 | Nagami |
| 7,698,396 B2 | 4/2010 | Aoyagi |
| 7,804,781 B2 | 9/2010 | Xu |
| 7,822,837 B1 | 10/2010 | Urban |
| 7,860,016 B1 | 12/2010 | Vijendra |
| 7,894,461 B2 | 2/2011 | Pei |
| 7,945,658 B1 | 5/2011 | Nucci |
| 7,975,045 B2 | 7/2011 | Underwood |
| 7,990,892 B2 | 8/2011 | Boucadair |
| 8,015,139 B2 | 9/2011 | Bahl |
| 8,130,767 B2 | 3/2012 | Aitken |
| 8,161,152 B2 | 4/2012 | Ogielski |
| 8,170,552 B2 | 5/2012 | Patel |
| 8,185,619 B1 | 5/2012 | Maiocco |
| 8,208,377 B2 | 6/2012 | Subramanian |
| 8,214,876 B2 | 7/2012 | Vaidyanathan |
| 8,228,815 B2 | 7/2012 | Keromytis |
| 8,254,273 B2 | 8/2012 | Kaminsky |
| 8,325,720 B2 | 12/2012 | Gao |
| 8,438,427 B2 | 5/2013 | Beck |
| 8,458,301 B1* | 6/2013 | Andrus ............... H04L 41/0816 709/220 |
| 8,484,374 B2 | 7/2013 | Zisapel |
| 8,490,055 B2 | 7/2013 | Basak |
| 8,521,904 B1 | 8/2013 | Pei |
| 8,542,612 B1 | 9/2013 | Uttaro |
| 8,549,124 B2 | 10/2013 | Duggan |
| 8,549,405 B2 | 10/2013 | Bugenhagen |
| 8,572,281 B1 | 10/2013 | Jesuraj |
| 8,751,619 B2 | 6/2014 | Tychon |
| 8,971,323 B2 | 3/2015 | Mithyantha |
| 9,014,012 B2 | 4/2015 | Jeyachandran |
| 9,411,787 B1 | 8/2016 | Lad |
| 10,042,958 B2 | 8/2018 | Bekas |
| 2002/0120727 A1 | 8/2002 | Curley |
| 2002/0141400 A1 | 10/2002 | Demartino |
| 2002/0199016 A1 | 12/2002 | Freedman |
| 2003/0056140 A1 | 3/2003 | Taylor |
| 2003/0174650 A1 | 9/2003 | Shankar |
| 2003/0236844 A1 | 12/2003 | Kaler |
| 2004/0046785 A1* | 3/2004 | Keller ................. G06F 9/5061 715/734 |
| 2004/0221296 A1 | 11/2004 | Ogielski |
| 2005/0036487 A1 | 2/2005 | Srikrishna |
| 2005/0114500 A1 | 5/2005 | Monk |
| 2005/0198269 A1 | 9/2005 | Champagne |
| 2005/0222815 A1 | 10/2005 | Tolly |
| 2005/0243729 A1 | 11/2005 | Jorgenson |
| 2006/0023638 A1 | 2/2006 | Monaco |
| 2006/0074946 A1 | 4/2006 | Pham |
| 2006/0098586 A1 | 5/2006 | Farrell |
| 2006/0291446 A1 | 12/2006 | Caldwell |
| 2007/0043861 A1* | 2/2007 | Baron ................. H04L 41/0631 709/224 |
| 2007/0162595 A1 | 7/2007 | Samprathi |
| 2007/0250902 A1 | 10/2007 | Vaidyanathan |
| 2008/0049777 A1 | 2/2008 | Morrill |
| 2008/0089347 A1 | 4/2008 | Phillipi |
| 2008/0155093 A1 | 6/2008 | Dharmistan |
| 2008/0222068 A1* | 9/2008 | Bahl ..................... G06N 5/043 706/46 |
| 2008/0222287 A1 | 9/2008 | Bahl |
| 2008/0263188 A1 | 10/2008 | Awduche |
| 2009/0055522 A1 | 2/2009 | Shen |
| 2009/0161556 A1 | 6/2009 | Qian |
| 2009/0204795 A1 | 8/2009 | Nasuto |
| 2009/0276771 A1 | 11/2009 | Nickolov |
| 2010/0002578 A1 | 1/2010 | Fiorone |
| 2010/0080129 A1 | 4/2010 | Strahan |
| 2010/0100627 A1 | 4/2010 | Evans |
| 2010/0118714 A1 | 5/2010 | Labovitz |
| 2010/0132039 A1 | 5/2010 | Ji |
| 2011/0145434 A1 | 6/2011 | Ringen |
| 2011/0286418 A1 | 11/2011 | Liu |
| 2012/0017165 A1 | 1/2012 | Gardner |
| 2012/0151041 A1 | 6/2012 | Gerber |
| 2012/0191826 A1 | 7/2012 | Gotesdyner |
| 2012/0207161 A1 | 8/2012 | Uppalli |
| 2012/0239799 A1 | 9/2012 | Wang |
| 2013/0311832 A1* | 11/2013 | Lad ..................... H04L 41/042 714/37 |
| 2014/0029443 A1 | 1/2014 | Bhavanam |
| 2014/0181292 A1 | 6/2014 | Venkataswami |
| 2014/0280917 A1 | 9/2014 | Lad |
| 2014/0282027 A1 | 9/2014 | Gao |
| 2014/0304407 A1 | 10/2014 | Moon |
| 2014/0344926 A1* | 11/2014 | Cunningham ...... H04L 63/1441 726/22 |
| 2014/0351564 A1 | 11/2014 | Bekas |
| 2015/0156077 A1 | 6/2015 | Gao |
| 2017/0134957 A1 | 5/2017 | Gupta |
| 2017/0353243 A1 | 12/2017 | Brueckheimer |
| 2018/0121032 A1 | 5/2018 | Naous |
| 2018/0322219 A1 | 11/2018 | Bekas |
| 2018/0375953 A1 | 12/2018 | Casassa Mont |

FOREIGN PATENT DOCUMENTS

| | | |
|---|---|---|
| EP | 1402355 | 8/2018 |
| WO | 2007038953 | 4/2007 |

OTHER PUBLICATIONS

Author Unknown, Bgplayjs, What is BGPlay.js? Printed on Apr. 7, 2015.
Author Unknown, RIPE Network Coordination Centre, printed on Apr. 7, 2015.
Author Unknown, Route View 6447, Route Views Project Page, University of Oregon Route Views Project, Jan. 27, 2005.
Author Unknown, Routing Information Service (RIS), Oct. 7, 2013.
Slunk et al., Multi-Threaded Routing Toolkit (MRT) Routing Information Export Format, Oct. 2011.
Lougheed et al., A Border Gateway Protocol (BGP), Jun. 1989.
Rekhter et al., A Border Gateway Protocol 4 (BGP-4), Jan. 2006.

(56) References Cited

OTHER PUBLICATIONS

Vazquez et al., Internet Topology at the Router and Autonomous System Level, 2002.

Hong et al., An Online Monitoring Solution for Complex Distributed Systems Based on Hierarchical Monitoring Agents, Knolwdge and Systems Engineering, vol. 1, Advances in Intelligent Systems and Computing 244, pp. 187-198, 2014.

Tonn et al., Asgard—A Graphical Monitoring Tool for Distributed Agent Infrastructures, Advances in PAAMS, AISC 70, pp. 163-173, 2010.

* cited by examiner

FIG. 14

+ Add New Test — 1502

Test Details

- Layer: Network | Web — 1504
- Test Type: Agent to Server — 1506
- Test Name: Optional

Basic Configuration

- Target: e.g. google.com or 192.168.0.1 — 1508
- Protocol: ICMP — 1510
- Interval: 5 minutes — 1512
- Agent Label: No label selected... — 1514
- Max No. of Agents: 8 — 1516

1518

99% of the time in the past 24th, the no. of matching agents was ≥ 8.

Cancel | Create New Test — 1520

Views Enabled for This Test

Test Views: Network

FIG. 15

SCHEDULED TESTS FOR ENDPOINT AGENTS

CROSS REFERENCE TO OTHER APPLICATIONS

This application is a continuation in part of co-pending U.S. patent application Ser. No. 15/622,535 entitled MONITORING ENTERPRISE NETWORKS WITH ENDPOINT AGENTS filed Jun. 14, 2017 which is incorporated herein by reference for all purposes, which claims priority to U.S. Provisional Application No. 62/350,632 entitled MONITORING ENTERPRISE NETWORKS WITH ENDPOINT AGENTS filed Jun. 15, 2016 which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

FIG. 14 is a screen diagram of dialog for creating a new test for dynamic assignment to endpoint agents in accordance with some embodiments.

FIG. 15 is a screen diagram of dialog for creating an agent to server (network layer) test for dynamic assignment to endpoint agents in accordance with some embodiments.

DETAILED DESCRIPTION

Figure 1:
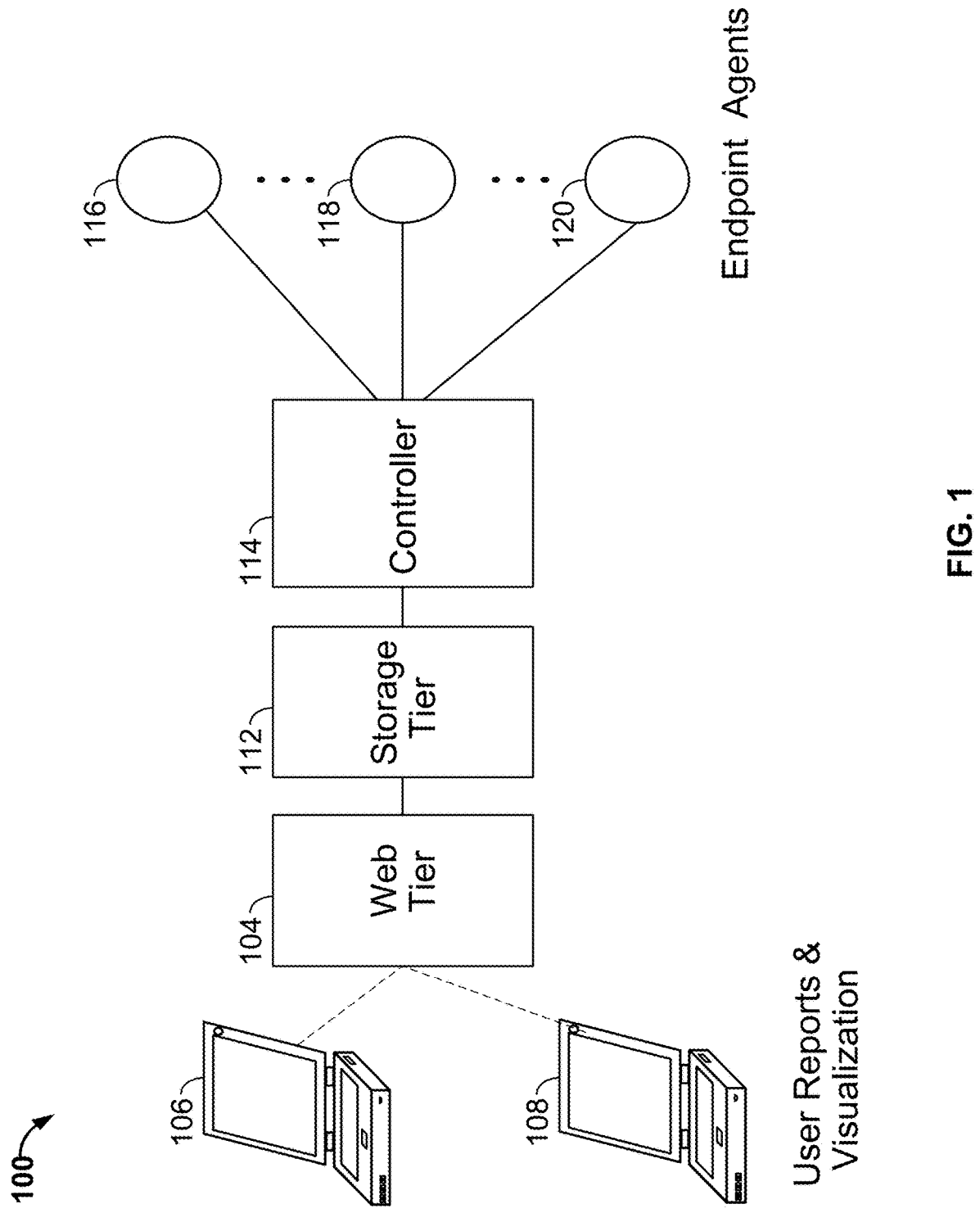
FIG. 1 illustrates a functional block diagram of a platform for providing enterprise network monitoring using scheduled tests for endpoint agents in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site can present significant challenges.

Further, agents for clients present additional technical challenges for deploying the performing of scheduled tests to such endpoint agents executed on clients (e.g., client/endpoint devices). For example, endpoint agents are not as stable as compared to enterprise/cloud agents (e.g., clients can go offline). Also, targeting endpoint agents for testing should be performed to avoid burdening or overloading a network (e.g., enterprise network) or service (e.g., to avoid flooding a service, which can bring down the service). Another technical challenge for deploying scheduled tests to such agents executed on clients is that it may not be known where client agents (e.g., also referred to as endpoint agents) are located at any given time. These and other technical challenges for providing the monitoring of enterprise networks with scheduled tests for endpoint agents are further described below.

What are needed are new and improved techniques to monitor, visualize, and troubleshoot the performance of cloud-based/web-based services (e.g., distributed applications and SaaS-based solutions available as web services via web sites and/or using other cloud-based implementations of distributed applications) using scheduled tests for endpoint agents.

Overview of Techniques for Scheduled Tests for Endpoint Agents

Accordingly, techniques for monitoring enterprise networks (e.g., enterprise IT networks) with endpoint agents, and specifically, techniques for providing scheduled tests for endpoint agents are disclosed.

For example, techniques for monitoring enterprise networks using scheduled tests for endpoint agents are disclosed that can safely and securely collect information from end-user devices (e.g., client/user/endpoint devices) without requiring additional configuration from the end user. As described herein, an example implementation of the agent is referred to as an endpoint agent. In this example implementation, the endpoint agent can be implemented as a software package that can be executed on end-user devices (e.g., desktops, laptops, tablets, smart phones, and/or other devices) and monitors network activity associated with the user activities (e.g., the user browser activity) to capture user experience and infrastructure performance metrics as further described below.

In some embodiments, techniques for monitoring enterprise networks (e.g., enterprise IT networks) using scheduled tests for endpoint agents are disclosed as further described below with respect to various embodiments. For example, an endpoint agent can generally refer to a functional component (e.g., software implemented as a software package executed on client/user devices) that is configured to perform one or more of the disclosed techniques. An endpoint can generally refer to the device where the endpoint agent is installed and/or executed, in which the endpoint is a data source for monitored network activity (e.g., monitored using the endpoint agent), as further described below. A Network Monitoring Service Provider (NMSP) cloud (e.g., provided by a network monitoring service provider, such as ThousandEyes, Inc. or another commercial network monitoring service provider) can generally refer to the backend services supporting the endpoint agent(s), as further described below. A data subscriber (e.g., an NMSP cloud subscriber) can generally refer to an account (e.g., a ThousandEyes account) that is entitled to receive data (e.g., monitored network activity data) from a set of endpoints, as further described below. An endpoint owner can generally refer to the account (e.g., ThousandEyes account) to which the endpoint (e.g., endpoint device) belongs, as further described below. A current network can generally refer to the network where the endpoint is connected to and using the Internet, as further described below.

In some embodiments, a data subscriber's configuration identifies one or more networks that are owned by the data subscriber and/or one or more networks that are associated with the data subscriber (e.g., networks to be monitored using the disclosed techniques for network monitoring using scheduled tests for endpoint agents). For example, owned networks can generally refer to networks that are owned by data subscribers, as further described below. Monitored networks can generally refer to a range of IP addresses of endpoints of interest to the data subscriber, as further described below. Whitelisted domains can generally refer to domain names specified by the data subscriber, as further described below.

Various techniques for configuring and performing scheduled tests using endpoint agents (e.g., a global system of endpoint agents) for monitoring enterprise networks are disclosed. Example periodic scheduled tests can include network path tests, HTTP tests, and/or other network infrastructure tests as further described below. Endpoint agents can be configured to perform scheduled tests based on a matching label in which agents check-in periodically (e.g., at which point the agent control plane can determine if the current state of the endpoint agent matches the existing scheduled tests labels and if there are slots available to schedule). Test data (e.g., test results data, also referred to herein as test data points) can be collected and/or received from endpoint agents that were configured to perform periodic scheduled tests (e.g., transmitted to the agent ingress and subsequently processed and stored). The test data can be used to generate a graphical visualization of an application delivery state for one or more application delivery layers based on the test results, generating an alert based on the test results and a set of alert rules, and/or generating a report based on the test results.

In some embodiments, a system/process/computer program product for providing scheduled tests for endpoint agents includes receiving a test configuration for scheduled tests that includes a set of conditions for dynamically selecting endpoint agents that match the set of conditions in the test configuration, wherein a plurality of endpoint agents is deployed to a plurality of endpoint devices; identifying one or more of the plurality of endpoint agents that match the set of conditions in the test configuration; assigning the scheduled tests associated with the test configuration to the matching endpoint agents for execution of the scheduled tests based on the test configuration, wherein test results are based on the scheduled tests executed on each of the matching endpoint agents for monitoring network activity; and receiving uploaded results of the scheduled tests executed on the matching endpoint agents, wherein the uploaded results of the scheduled tests executed on the matching endpoint agents are processed for generating graphical visualizations and/or alerts of the monitored network activity.

In some embodiments, a system/process/computer program product for providing scheduled tests for endpoint agents further includes deploying a plurality of endpoint agents to a plurality of endpoint devices. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

In some embodiments, a system/process/computer program product for providing scheduled tests for endpoint agents further includes receiving a label for scheduled tests that includes a set of conditions for dynamically selecting endpoint agents that match the set of conditions in the test configuration. For example, a plurality of endpoint agents are deployed to a plurality of endpoint devices, and the endpoint agents can be selected for execution of one or more scheduled tests based on the set of conditions as similarly described above. The test configuration can also include a test type (e.g., a network layer test, a web layer test, etc.), a target (e.g., a server, website, etc.), and an interval (e.g., every 1 minute, 5 minutes, or some other time interval) for executing the scheduled tests as similarly described above.

In some embodiments, a system/process/computer program product for providing scheduled tests for endpoint agents further includes receiving a configuration input for setting a maximum number of endpoint agents that are to be selected for concurrently performing the scheduled tests.

In some embodiments, a system/process/computer program product for providing scheduled tests for endpoint agents further includes periodically receiving check-ins from each of the plurality of endpoint agents. For example, the agents can check-in to provide current state information as similarly described above.

In some embodiments, a system/process/computer program product for providing scheduled tests for endpoint agents further includes dynamically selecting a subset of the plurality of endpoint agents that match the label based on their current state information. The subset of the plurality of endpoint agents does not exceed the maximum number of endpoint agents that are to be selected for performing the scheduled tests. The selected endpoint agents will then receive the scheduled tests and execute the scheduled tests based on a configured interval as similarly described above.

In some embodiments, a system/process/computer program product for providing scheduled tests for endpoint agents further includes generating an alert or a report based on the uploaded results of the scheduled tests executed on the matching endpoint agents. For example, an alert based on the test results can be generated and output (e.g., a GUI alert, an email/text/phone call alert, and/or other alert notification can be provided based on a configuration for alert notifications and/or based on the alert). As another example, a report can be generated that includes aggregated test data results, such as over a period of time (e.g., 30 days, 90 days, and/or some other configurable period of time). As yet another example, the alert or report can include an event that is determined based on the test results (e.g., events can be based on results from one endpoint agent and/or based on results from two or more endpoint agents (collective intelligence based on endpoint agent data collection, which can also include test results from other agents executed on network infrastructure elements/devices, destination sites, and/or cloud agents)). Example events that can be detected using the disclosed techniques can include detection of traffic outages, network infrastructure outages, application outages, and Internet Intelligence.

As further described below, these and various other features and techniques are disclosed for monitoring enterprise networks with endpoint agents.

Deployment of Endpoint Agents

In one embodiment, an endpoint agent is deployed to an endpoint via an installation package. For example, an endpoint owner Alice can download a customized installer, and when installed on an endpoint, this device can be associated with endpoint owner Alice. Configurations and updates can be automatically downloaded from an NMSP Cloud (e.g., periodically, on demand, and/or as needed). In this example, after the installation of the endpoint agent on the endpoint, no configurations would need to be performed by the end user.

Also, in some cases, installation of the endpoint agent on the endpoint can be automated (e.g., using Windows Group Policies and/or other commercially available solutions for such automated installations of software packages on end-user devices). As a result, such an automated installation would not require involvement by end users (e.g., providing for an easy and seamless deployment and execution of the endpoint agent on the endpoints that is transparent to the end users).

In an example implementation, the customized installers are generated on-demand by backend services. The build system creates a non-activated package, and when requested by the endpoint owner, the package is customized with a globally unique account token and the package is activated on the endpoint.

Endpoint Data Collection Using Endpoint Agents

In one embodiment, performance data collected from end-users is processed to determine how users are experiencing different applications, troubleshooting performance degradation, and establishing trends and patterns across physically distributed points in the network.

An example of a system architecture of a platform for providing enterprise network monitoring using scheduled tests for endpoint agents is shown in FIG. 1 as described below.

System Architecture of a Platform for Providing Enterprise Network Monitoring Using Scheduled Tests for Endpoint Agents FIG. 1 illustrates a functional block diagram of a platform for providing enterprise network monitoring using scheduled tests for endpoint agents in accordance with some embodiments. In particular, FIG. 1 illustrates an environment in which a platform for cross-layer visibility and troubleshooting of distributed applications 100 includes endpoint agents 116-120 (e.g., which can be configured to perform certain tests, have labels, and/or perform on demand, event/context triggered, and/or scheduled tests, such as similarly described herein) that collect data based on configured tests, and the endpoint agents 116-120 send this data to a controller(s) 114 (e.g., agent controller(s)). Controller 114 stores the data in a storage tier 112 (e.g., providing permanent storage) that can be used by a web tier 104 to generate visualizations, alerts, and/or reports to users accessing the platform 100 using client/endpoint devices (e.g., computers, laptops, smartphones, and/or various other computing devices).

For example, a report can be output to a user to present the collected and analyzed cross-layer application delivery information of a distributed application. Example reports can include various visualizations and/or diagnostic information as further described herein with respect to various embodiments. For example, the report can facilitate troubleshooting application delivery associated with the distributed application to determine whether performance problems are the result of the cloud provider of the distributed application, the customer's own internal IT network, a user's client device, and/or intermediate network providers between the user's client device and the cloud provider. The report can also include recommendations to the user to resolve any such determined application delivery problems associated with the distributed application. In some cases, the report can also be provided to a third party, such as the Software as a Service (SaaS) provider of the distributed application and/or a network provider, which can be provided as information to indicate the source of such determined application delivery problems associated with the distributed application.

In the example shown, the user of client/endpoint device 106 (hereinafter referred to as "Bob") is employed as an IT manager of a distributed application company ("SaaS Company"). The user of client device 108 (hereinafter referred to as "Alice") is employed as an IT manager of a national company ("ACME Company"). As will be described in more detail below, Bob and Alice can each access the services of platform 100 (e.g., platform for cross-layer visibility and troubleshooting of distributed applications) via web tier 104 over a network, such as the Internet. The techniques described herein can work with a variety of client devices 106-108 including, for example, personal computers, tablet computers, smartphones, and/or other computing devices.

In some embodiments, platform 100 generates various reports based on results of the network performance tests to facilitate cross-layer visibility and troubleshooting of application delivery associated with a distributed application(s), as further described herein. In some embodiments, platform 100 includes a data store, such as storage tier 112, for storing results of the network performance tests and/or the reports.

In some embodiments, a set of agent controllers 114 is provided as shown to send various tests (e.g., such as the various scheduled tests described herein with respect to various embodiments) to the endpoint agents for execution by the endpoint agents. For example, endpoint agents can be executed on client/endpoint devices, which are controlled by agent controllers to perform one or more scheduled tests as further described herein, in which the test results can be collected for correlation and analysis, as further described herein with respect to various embodiments.

In some embodiments, the tests are configured through a web interface by a user (e.g., an IT/network admin for ACME Corporation). For example, typical parameters can include the frequency of various tests (e.g., periodic, scheduled, on demand, and/or triggered based on events/context information associated with the agents/endpoints or other context information), the target of the tests, and the agents (e.g., based on labels and/or other criteria/context information associated with the agents/endpoints or other context information) where the tests are to be performed. The test parameters can be sent from the controller (e.g., agent controllers 114) to the endpoint agents after an endpoint agent checks-in (e.g., using a pull mechanism and/or additional techniques as will be further described below). After an endpoint agent executes a test, the endpoint agent can export the test result(s) back to the controller. The controller can then provide the results back to a data store (e.g., storage tier 112) for permanent storage (e.g., or temporary storage). Besides periodic tests, a controller can also send on-demand tests, scheduled, and/or triggered tests to an agent(s) through, for example, a Remote Procedure Call (RPC) for immediate or on-demand execution. Techniques for performing scheduled tests for endpoint agents will be further described below.

In various embodiments, platform 100 is a scalable, elastic architecture and may comprise several distributed components, including components provided by one or more third parties. Further, when platform 100 is referred to as performing a task, such as storing data or processing data, it is to be understood that a sub-component or multiple sub-components of platform 100 (whether individually or in cooperation with third party components) may cooperate to perform that task.

In some embodiments, tests include various types of tests to facilitate cross-layer visibility and troubleshooting of application delivery associated with a distributed application(s), as further described herein. Example network tests include data path measurement tests, routing path measurement tests, and end-to-end network metrics tests. Example DNS tests include per name server testing and Domain Name System Security Extensions (DNSSEC) bottom-up validation tests. Example HTTP tests include testing of steps of a Uniform Resource Locator (URL) fetch. Example page load tests include testing of a load of an entire web page using a web browser (e.g., a typical web browser). Example transaction tests include performing a multi-step scripted transaction from a web browser (e.g., a typical web browser). These and various other tests are described herein.

Example system implementations and processes for monitoring enterprise networks (e.g., enterprise IT networks) using scheduled tests for endpoint agents using the disclosed techniques will now be further described below.

Figure 2:
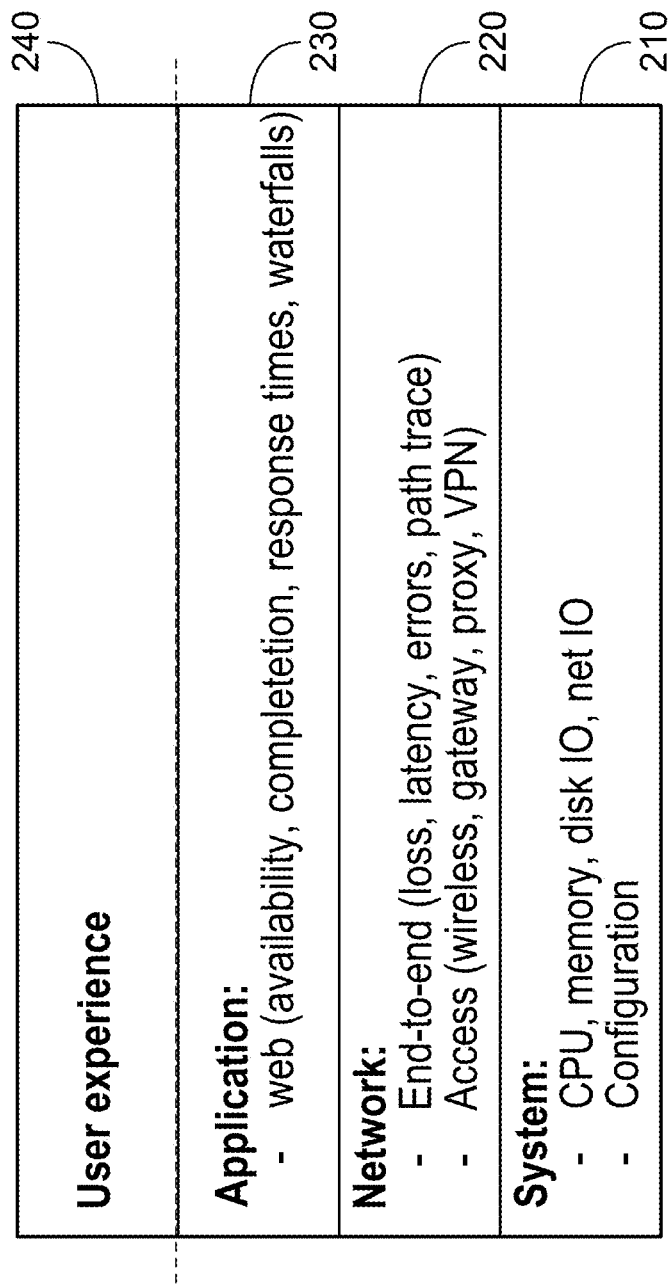
FIG. 2 is a network layer diagram illustrating that the data collected from endpoints is segmented into different network layers in accordance with some embodiments.

FIG. 2 is a network layer diagram illustrating that the data collected from endpoints is segmented into different network layers in accordance with some embodiments. In one embodiment, the data collected from endpoints is segmented into different layers as shown in FIG. 2.

For example, the data can be collected in the following ways: (1) user triggered; (2) periodic network access and system data; and/or (3) scheduled tests, as further described below. User triggered data collection can be triggered by user activity, such as triggered by user activity in the browser executed on the endpoint, and can collect data from all layers below the dashed line (i.e., below user experience layer 240), including a system layer 210, a network layer 220, and an application layer 230 as shown in FIG. 2. Periodic network access and system data can be used to collect periodic active network measurements to network infrastructure and capture a system resource snapshot of the endpoint. In an example implementation, scheduled tests can be used to perform active probing from endpoints to predefined targets by an endpoint owner, including, for example, an HTTP server (e.g., a web server, such as a site associated with a cloud service, distributed application, or other network/distributed service/application), network and path trace, and/or other tests can be performed to collect data/measurements relevant to/from all the layers below the dashed line as shown in FIG. 2.

In this example, the data collected includes a combination of passive and active monitoring. In some cases, network access tests, system tests, and scheduled tests are periodic whereas the user session data (e.g., web application metrics that include network metrics towards the visited site, such as a web site) is triggered by user activity. As such, periodically collecting such data can provide a better representation of the local environment and a cleaner baseline to detect anomalies and compute trends associated with, for example, network activities and performance.

Technical Challenges to Collecting Data from Endpoints Using Endpoint Agents

Data collection from end-user devices has several technical challenges, such as due to mobility of end-user devices, limited resources of end-user devices, and privacy/security concerns for users/owners of end-user devices. Because end-user devices can move, the disclosed system and techniques are provided to handle moving between networks with different owners, technologies, set-ups, and/or other similar variables for mobile devices when collecting data from deployed endpoint agents. For example, assume that an end-user Bob is inside an enterprise environment and data collection is being performed by the endpoint agent executed on Bob's endpoint that includes monitoring network activities/performance on the local IT network (e.g., enterprise network). At the end of the day, Bob returns home and transitions to his privately owned network (e.g., home network). This example presents technical challenges for implementing the disclosed techniques using endpoint agents, such as for the following questions. Should data collection continue? Or should just a subset of the metrics be collected? If the data (or a subset of the data) is collected, who should be allowed access to this data? How to detect that the user is moving between networks (e.g., from an enterprise network to a home network or other networks)?

In some embodiments, to facilitate a solution to these technical challenges, the concept of a Data Collection Profile (DCP) is disclosed. In one embodiment, a DCP is provided that describes the domains that should trigger automatic recording (e.g., automatic data collection using the endpoint agent) when the user visits the domain in his/her browser; it defines if and how often periodic tests towards local network resources should be performed and/or other policies/rules can be configured based on the DCP.

For example, the DCP can be associated with a set of networks defined by the IP range of the public IP assigned to the end-user device. As such, the DCP can be used to facilitate defining different behavior as users move between various networks (e.g., from an enterprise network to a home network and/or to other networks). As an example, when Bob is using his laptop on the enterprise network while at the office of his employer's company, in which the enterprise network is defined by a predetermined IP address range, the DCP can be configured such that the endpoint agent can monitor domain set A and perform gateway/wireless periodic network tests. However, when Bob is using his laptop outside the office (e.g., or in this example, using any other networks), then the DCP can be configured such that the endpoint agent can only gather system information associated with his laptop.

In one embodiment, an active DCP is determined by a check-in request to the NMSP cloud that responds with the current DCP based on the public IP address of the check-in request. For example, this can include all information used to collect data until a network change is detected (e.g., the endpoint is associated with a different current network).

Network Identification

In one embodiment, techniques for correlation and network identification using a networkId are disclosed. In one embodiment, the networkId is specified as follows:

$$networkId=hash(publicIpRange+localPrefix)$$

where publicIpRange is the public prefix of the public IP address of the endpoint device based on, for example, WHOIS data (e.g., a WHOIS lookup), and localPrefix is the prefix of the local IP address of the device. The networkId facilitates correlating data within the same network across devices as described herein.

Example: Network Identification

For example, for device A on network X, which has public IP address 24.51.61.41 belonging to BGP prefix 24.51.61.0/24, and device A has local IP address 10.0.0.34 on a 255.255.255.0 subnet, the result in the networkId would be as shown below.

networkId=hash(24.51.61.0/24+10.0.0.0/24)

Verified Network Range

In an example implementation, an IT/network administrator can associate a DCP to any network range (e.g., in this example implementation, assuming that it is not verified by any other accounts at the NMSP). An account (e.g., subscriber of the NMSP) can verify a network range, ensuring that no other account can collect performance or network information from within the specific network.

For example, assume that an endpoint (with an installed endpoint agent) belonging to Alice visits the offices of the ACME Company. Also assume that ACME Company has an endpoint agent that is configured to monitor on all networks. However, when a device of ACME Company, such as Alice's device, enters BIGCO Company's network, the endpoint agent is disabled as BIGCO Company verified its network range (e.g., with the NMSP for the endpoint agent as described above). As such, only endpoint agents associated with BIGCO Company can collect data from within the verified network(s) associated with BIGCO Company.

In one embodiment, network validation of range R by company X can be performed using various techniques. Example techniques for performing network validation will now be described.

In one embodiment, network validation is performed using a WHOIS-based confirmation email. For example, range R can be looked up in WHOIS, and an email can then be sent to the email contact listed in the WHOIS look-up result. The email can include a unique validation token (e.g., provided by the NMSP) and a link that the recipient of the email can click on to validate ownership of range R. As such, once the recipient of the email clicks the link in the email, it validates ownership of the range R.

In one embodiment, network validation is performed using a DNS-based validation. For example, a user can insert a TXT entry pegged to the PTR entry they own (e.g., if they want to validate 192.168.2.0/24, then they can have a 192.168.2.verify_te TXT record with a unique validation token provided by the NMSP).

In one embodiment, network validation is performed using a manual validation. For example, a request can be sent to the NMSP (e.g., ThousandEyes) containing the IP range R that is to be validated and the requester.

Network Access Topology

In one embodiment, the endpoint agent performs periodic active measurements to access points, gateways, proxies, DNS servers, and VPN termination servers. For example, by performing such active measurements periodically, the agents can discover the topology of the network access and build a baseline of performance over time. In this example, each agent discovers the local environment using active measurements and information collected directly from the endpoints, such as wireless network quality to the access point, network performance to the gateway/proxy, DNS response time, and VPN performance metrics.

In one embodiment, for collecting local network performance data, a dynamic target list is deployed that is updated according to the user activity. For example, the dynamic target list can define which proxies and/or VPN servers should be targeted in the active network tests.

In an example implementation, a dynamic target list is a bounded list with a time expiration on each entry. In this example, if a proxy or VPN is used by the user in the browser, then the target is added to the list with the current timestamp (e.g., if only select traffic is routed through the VPN/proxy, and/or multiple VPNs/proxies exist dependent on the destination, this can produce multiple VPN/proxy targets; if the user never generated the specific traffic, the VPNs/proxies may not even be used). If the target already exists, then the timestamp is simply updated to the current. If the list exceeds its maximum size, then the entry with the lowest timestamp is removed. The periodic network prober then uses this list and performs network tests against entries that have not expired. By maintaining a list per network, this facilitates the endpoint agent to continuously/periodically perform local network tests even when the user is moving between different networks.

In addition to the dynamic target list based on user activity including browsing activity, there are some targets that are independent of browsing activity, such as the default gateway. For example, the endpoint agent can be periodically probing the default gateway and measuring the wireless properties if it connects to the default gateway through a wireless interface.

Figure 3:
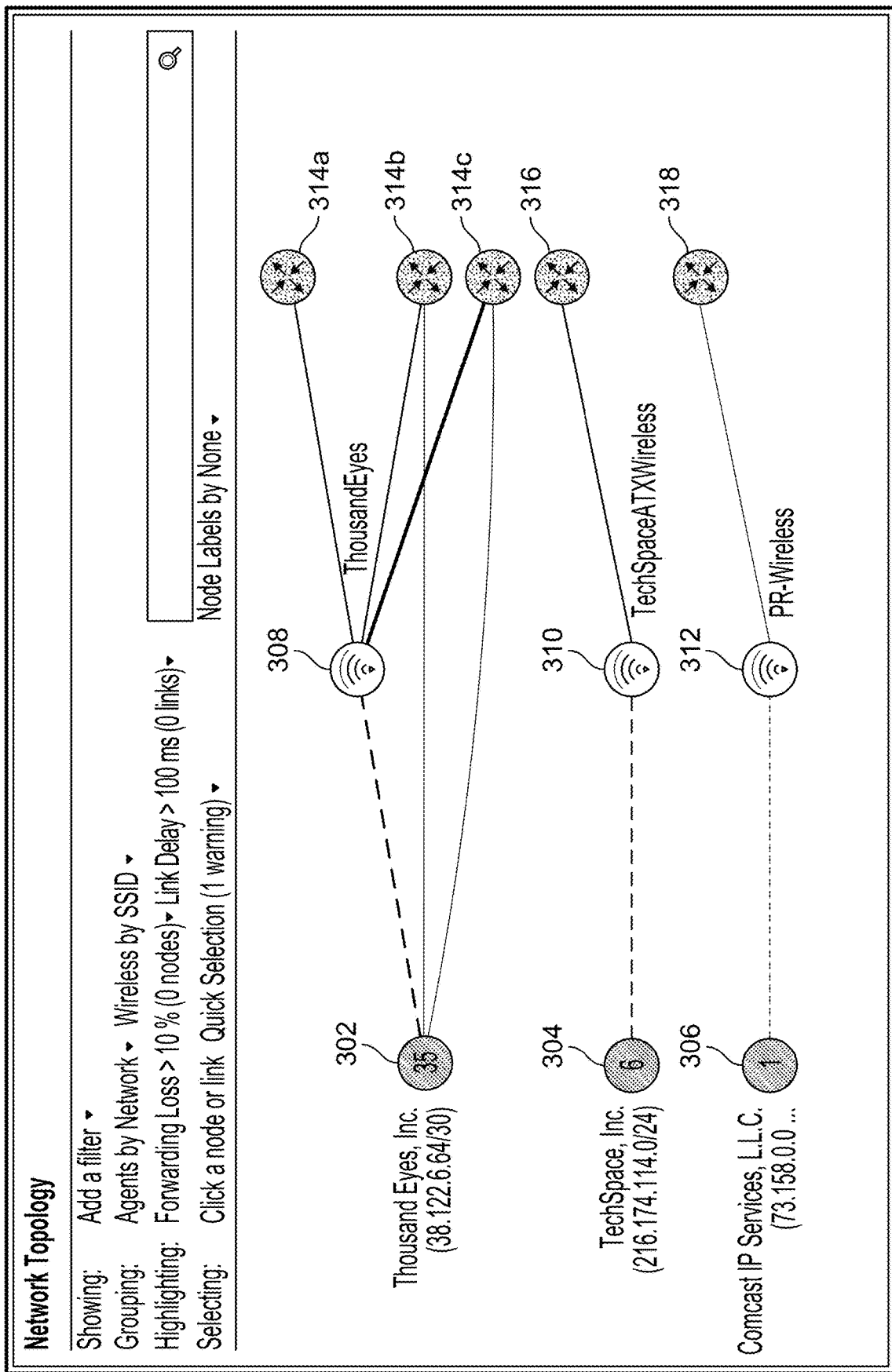
FIG. 3 is a graphical visualization of a network topology generated using endpoint agents in accordance with some embodiments.

FIG. 3 is a graphical visualization of a network topology generated using endpoint agents in accordance with some embodiments. As shown, endpoint agent groups 302, 304, and 306 can be utilized to facilitate a visualization of the access network for each of the agents over time, in this case including access points 308, 310, and 312, and which gateways are being used as shown at 314a-c, 316, and 318 (e.g., as well as a path(s) to VPN servers and proxies (not shown in this example in FIG. 3)). Examples of metrics collected can include one or more of the following listed metrics: transmission rate, wireless signal quality, gateway loss and latency, proxy loss and latency, and VPN server loss and latency.

Data Routing Workflow for Data Collected from Endpoint Agents

In one embodiment, a workflow for routing of collected data from deployed endpoint agents is performed as will now be described. Assume that an endpoint agent owned by ACME Company is inside a network R. Example scenarios of routing of the collected data (e.g., endpoint agent collected/aggregated data) are provided below.

If R is verified by BIGCO Company, then there is a conflict and the collected data (e.g., collected by the endpoint agent) is discarded.

If ACME Company subscribes to R or monitor all networks is enabled, then the collected data (e.g., collected by the endpoint agent) is routed to ACME Company.

If data subscriber C-CORP subscribes to data from ACME Company when in R and is approved by ACME Company, then the collected data (e.g., collected by the endpoint agent(s)) is routed to C-CORP.

If ACME Company does not subscribe to R, then the collected data (e.g., collected by the endpoint agent) is discarded.

The data routing mechanisms described above can be used with different types of end-user devices including mobile devices, laptops, desktops, tablets, and/or other end-user devices. They can also be applied for Virtual Desktop Infrastructure (VDI) environments, where users are behind thin clients connected to a central/VDI server as further described below.

Data Routing Workflow for Live Sharing for Data Collected from Endpoint Agents

In one embodiment, a workflow for routing of collected data from deployed endpoint agents is performed to facilitate live sharing of the collected data with one or more other entities as will now be described. Assume that an endpoint agent owned by ACME Company is inside a network R. Example scenarios of routing of the collected data (e.g., endpoint agent collected/aggregated data) to facilitate such live sharing techniques are provided below.

If another entity C-CORP requests to access the collected data from ACME Company and is approved by ACME Company (e.g., a pull request for live sharing, which may also include requesting that the entity/user authenticates that they are authorized for sharing such collected data as it is associated with their network domain and both entities/users approve of such live sharing), then the collected data (e.g., collected by the endpoint agent) is routed to C-CORP.

If ACME Corporation desires to provide access to the collected data from ACME Company (e.g., a pull request for live sharing, which may also include requesting that the entity/user authenticates that they are authorized for sharing such collected data as it is associated with their network domain and both entities/users approve of such live sharing), then the collected data (e.g., collected by the endpoint agent) is routed to C-CORP.

For example, such live sharing techniques for sharing the collected data can facilitate troubleshooting information to be shared by ACME Corporation with their Software as a Service (SaaS) provider (e.g., Microsoft for Office365 or another service/provider).

Example Endpoint Agent Architecture

Figure 4:
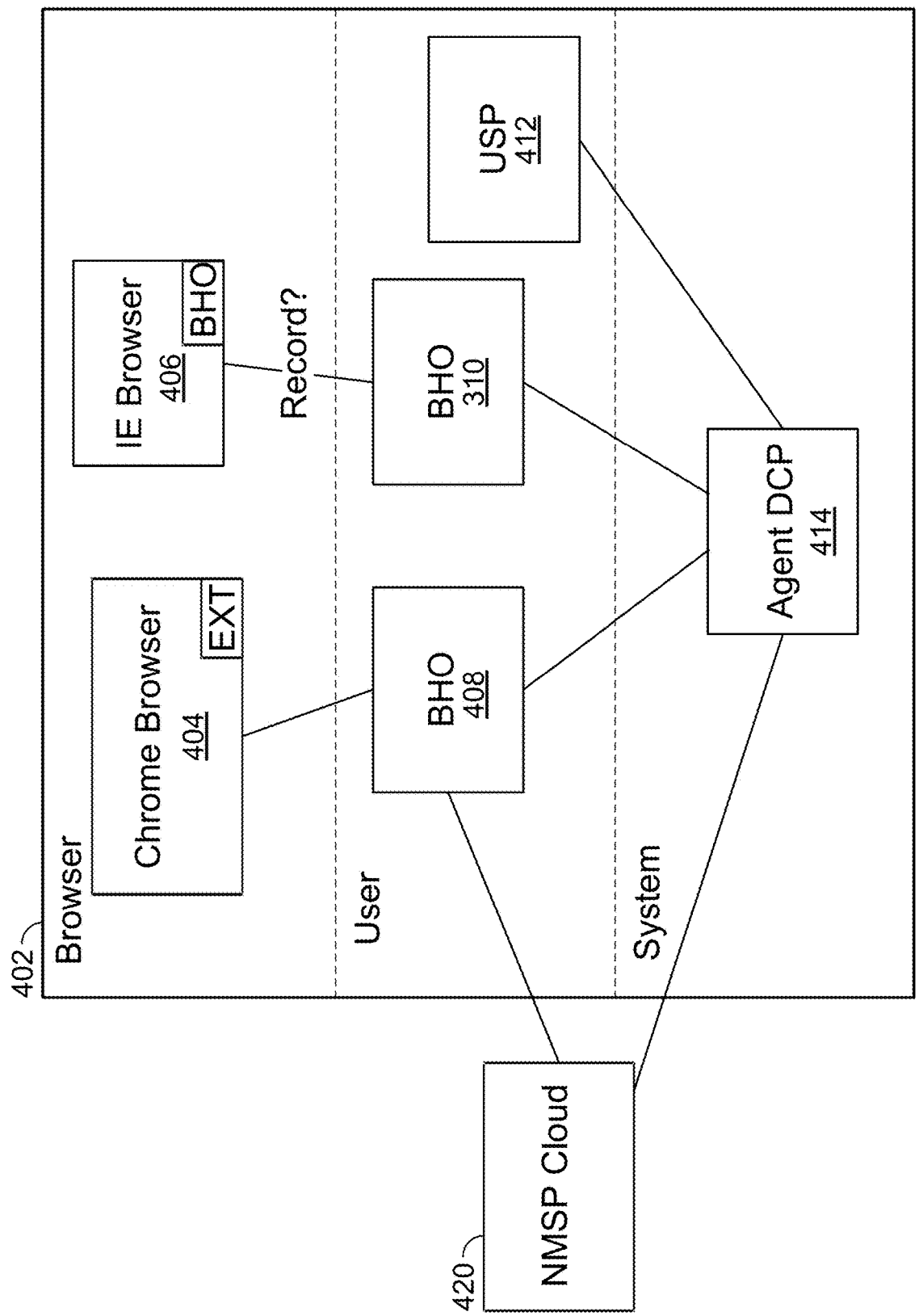
FIG. 4 is a functional block diagram of an architecture of an endpoint agent for an end-user device in accordance with some embodiments.

FIG. 4 is a functional block diagram of an architecture of an endpoint agent for an end-user device in accordance with some embodiments. In one embodiment, an endpoint agent (e.g., software package installable on end-user devices) includes multiple components installed and executed on an end-user device 402, which collaborate to collect and submit data to an NMSP cloud 420 as shown in FIG. 4.

Referring to FIG. 4, end-user device 402 is in network communication with NMSP cloud 420, such as via the Internet (not shown). The endpoint agent can include multiple components, which can be executed at different system layers (e.g., a system/kernel, a user space, and/or an application layer). In this embodiment, an agent DCP component 414 executes in the system layer and includes/stores the DCP for endpoint 402 received from NMSP cloud 420. Agent DCP 414 is in communication with Browser Helper Objects (BHO) 408 and 410, which can communicate with browser applications, such as a Google Chrome® browser 404 and a Microsoft Internet Explorer® browser 406 as shown. For example, BHO 410 can be configured to monitor user browser activity on the endpoint, and as similarly described above, network activity monitoring/tests can be triggered/performed based on the site accessed by the user using IE browser 406 and based on the DCP configuration for endpoint 402 as provided via agent DCP 414 (e.g., based on the current network, network domain, and/or other DCP policies/rules as similarly described above). As also shown, a User Space Proxy (USP) component 412 executed in the user space is provided and is in communication with agent DCP 414 (e.g., the USP can be used for enterprise environments that have all HTTP traffic routed through an authenticated HTTP proxy to access the Internet, such as further described below in the User Space Proxy section). As similarly described above, the endpoint agent can be configured to perform system monitoring/tests as well as network monitoring/tests using these various components executed on the endpoint. The system and network monitoring/tests data/results can be communicated to NMSP cloud 420 (e.g., periodically, on demand, and/or as needed).

In an example implementation, the endpoint agent includes a te-agent component and a te-browserhelper component. These components can be installed automatically by the software installer package. In this example implementation, the te-agent component is responsible for performing active network measurements, communication with the NMSP cloud, and performing periodic network/system measurements.

In this example implementation, the browser activity is gathered using a te-browserhelper component, which communicates with the browser via JavaScript Object Notation (JSON) Remote Procedure Call (RPC) and uses a te-agent to perform network measurements. For the Google Chrome® web browser, a custom extension (EXT) is installed that gathers performance metrics and streams the data to the browserhelper (BHO) (e.g., BHO 408) as it becomes available. For the Microsoft Internet Explorer® (IE) web browser, a Browser Helper Object (BHO) is installed that monitors web activity and likewise streams the data to the browserhelper (e.g., BHO 410). Additional helper components can be utilized to facilitate automatic update and optional user interactions.

General Operation of Endpoint Agents and Interactions with NMSP Cloud

In one embodiment, the endpoint agent periodically checks in with the NMSP cloud, which includes its current network and system profile as well as internal usage statistics. The NMSP cloud responds with a set of configurations that determines what data should be collected from the current network.

For example, response provided by the NMSP cloud can include a domain whitelist (e.g., encoded using a Bloom filter). In the case of the endpoint agent, this whitelist can be consulted to determine if a given domain should automatically be recorded. The check-in can be performed periodically or when a network change is detected (e.g., or based on other configurations or events).

An example system architecture of a platform for providing the NMSP cloud is described above with respect to FIG. 1.

Sample Data Collection from Endpoint Agents

In one embodiment, sample data is collected from the web browser and BHO working together. As described above, the endpoint agents can be implemented to support one or more commercially available web browsers, such as Google Chrome® and Microsoft Internet Explorer®. For Google Chrome, a standard Chrome extension can be used that uses the "chrome.webRequest" and "chrome.debugger" APIs of Chrome to extract timing and page information. For Internet Explorer, custom JavaScript can be injected into the page to extract the timing information.

Sample Types Including Extended Samples

In one embodiment, samples can be original or extended. A sample is original if a new page object triggered that sample (e.g., the first page in a session or if the user has been inactive for a configurable period and then browses to a new page). An extended sample is a sample that is triggered by a long running page that continuously generates entries (e.g., a one page website that refreshes its data every 30 seconds).

After a configurable period of time, these periodic entries will trigger a new sample that is said to be extending the original sample.

In one embodiment, recording extended samples using the endpoint agent facilitates collecting network data for long running sessions. For example, some sessions may span multiple hours or another extended period of time (e.g., a user may keep a browser open for a given site, such as Facebook, Salesforce.com, or another site/service for one or more days/weeks or another period of extended time). As such, recording extended samples can trigger samples periodically to augment the entries as they are collected (e.g., for predetermined time intervals, such as every 5 minutes, 1 hour, or some other time interval).

RPC Protocol for Web Browsers

In an example implementation, the format is further designed to facilitate separation of responsibility. The browser-based data collection software (e.g., such as for Google Chrome and Microsoft Internet Explorer as described above) can be configured to be aware of Session, Page, and Entry objects. This makes the monitoring process more efficient as no processing is needed in the browsers. The BHO component can manage the samples and when to create extended samples, how the data for the sample is gathered, and/or other such operations.

A simple Remote Procedure Call (RPC) protocol exists for web browsers, as shown below.

StartSession( )->sessionid
AddPage(sessionId, pageObj)
AddEntry(sessionId, entryObj)
UpdatePage(sessionId, pageUpdateObj)
EndSession(sessionId)

UpdatePage( ) is used to send updated information about a page if such becomes available (e.g., page title changed, updated page timings are available, etc.).

Sample Network Data

In this example, the sample object includes additional network information captured during a session. Example additional network information captured during a session can include one or more of the following: host, protocol, and port of HTTP connection; positional coordinates (e.g., resolved using GPS, Wi-Fi location, or network location services); TCP connectivity test towards destination; loss/latency/jitter/traceroute to destination (ICMP); loss/latency/jitter to gateway (ICMP); loss/latency/jitter/traceroute to VPN (ICMP) if configured on the device; loss/latency/jitter/traceroute to HTTP proxy (ICMP) if configured on the device; network configuration profile of network interfaces including IP addresses, DNS servers, gateways, and potential next hop interfaces (in the case of VPNs); physical network information including wireless quality, bssid/ssid, channel, link speed, and/or similar physical network information; proxy configuration profile; and system information including CPU usage, network usage, memory, and disk.

Path Tracing from Endpoints

Figure 5:
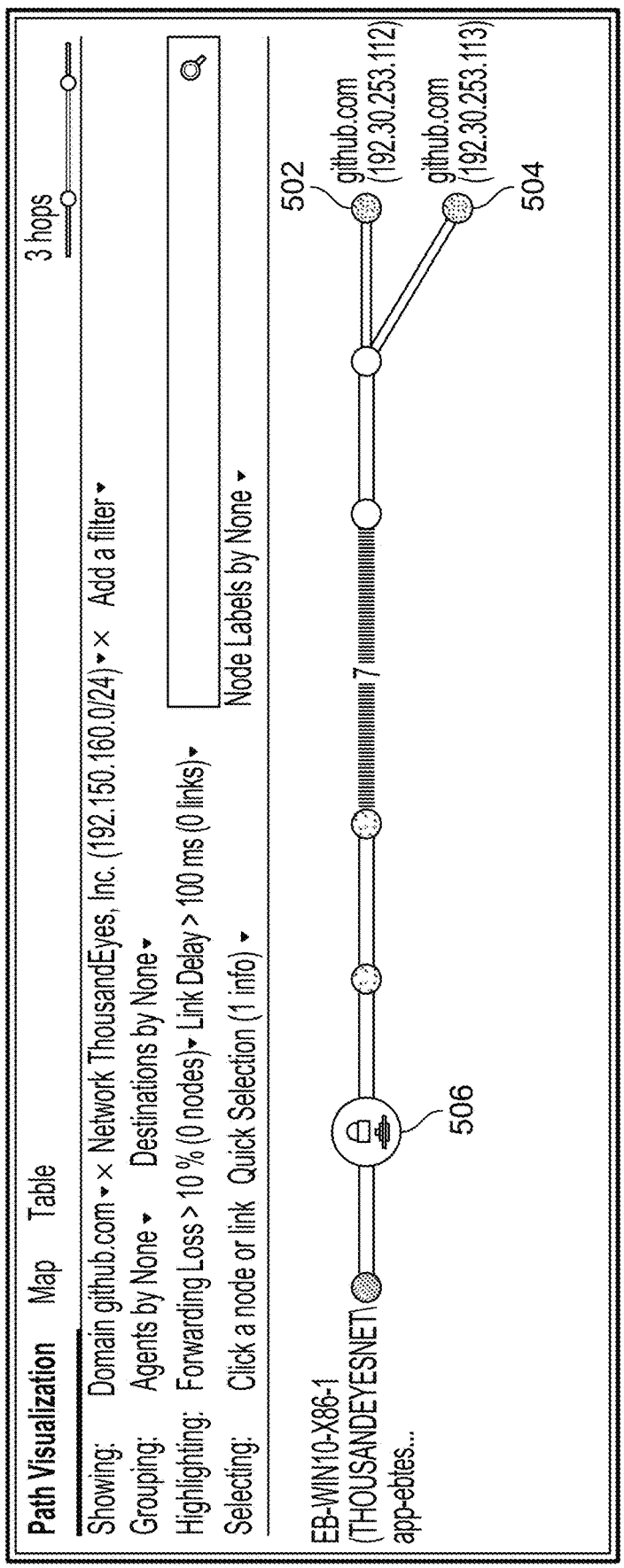
FIG. 5 is a graphical visualization that illustrates a path tracing from endpoints in accordance with some embodiments.

FIG. 5 is a graphical visualization that illustrates a path tracing from endpoints in accordance with some embodiments. In one embodiment, using similar techniques as described in U.S. Pat. No. 10,230,603 entitled CROSS-LAYER TROUBLESHOOTING OF APPLICATION DELIVERY filed Mar. 15, 2013, issued Mar. 12, 2019, which is incorporated herein by reference for all purposes, the path taken from a multitude of endpoints towards applications used in the browser can be reconstructed. Referring to FIG. 5, the web app Github is actually being served from two different servers as shown at 502 and 504.

In this example, a 1-hour time aggregation is used, in which the time aggregation can be configured by the user (e.g., from 5 minutes to 1 hour).

In an example implementation, known devices can be annotated in the path, such as in this example the first hop is a VPN server as shown at 506 in FIG. 5. This helps users to understand how their network is used by different applications and which network elements are associated with each user over time.

Endpoint Agent Communication with the NMSP Cloud

Figure 6:
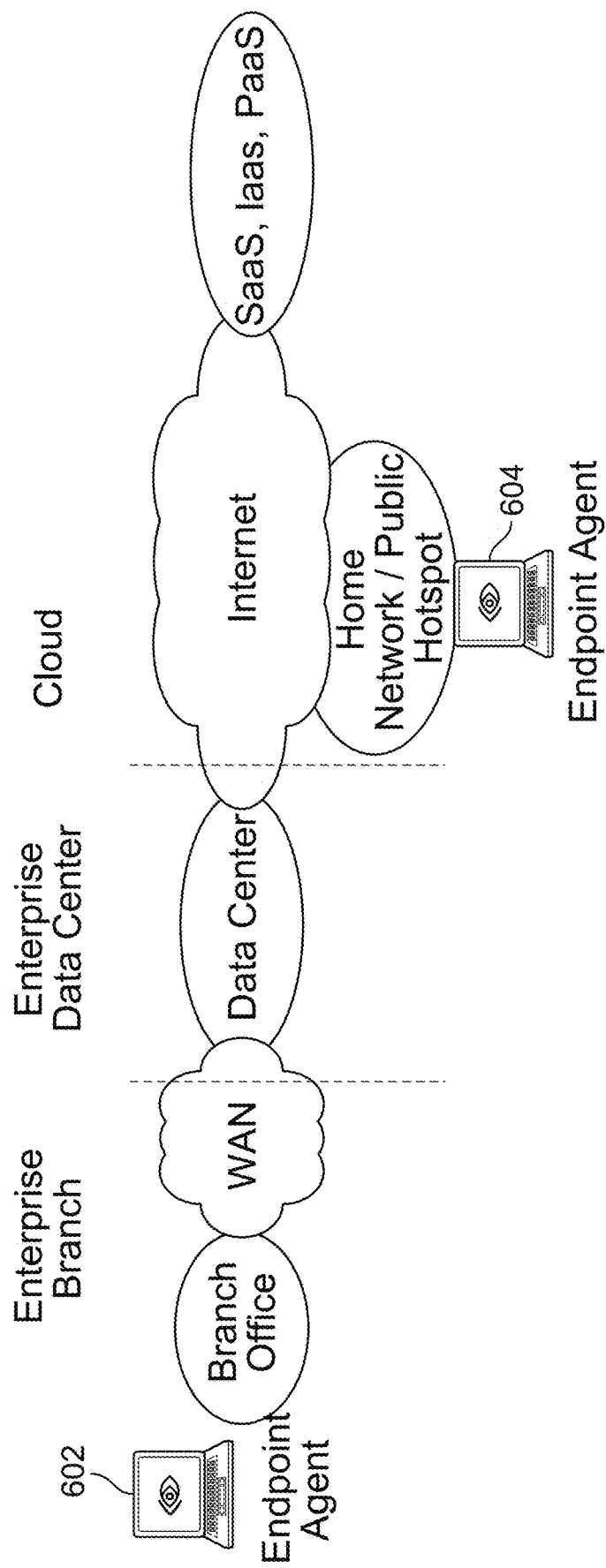
FIG. 6 is an example network environment that shows example endpoint agent deployments in accordance with some embodiments.

In an example implementation, communication with the backend/NMSP cloud (e.g., such as shown in FIG. 6) is performed using HTTPS and JSON encoded body (e.g., or other (secure) protocols and encodings can be used). Gzip compression (e.g., or other compression algorithms can be used) is applied to minimize data transfer of the collected data over the network to prevent taking up too much network bandwidth when performing such communications between the endpoint agent and the NMSP cloud. Further, data entries can be batched where a batch can be uploaded when either of the following conditions is satisfied: 1) batch size exceeds configurable threshold; or 2) batch has not been changed within the last predetermined period of time (e.g., X seconds).

Security and Privacy for Data Collection by Endpoint Agents

As discussed above, collecting data from end-user devices sets high requirements for privacy and security. As such, in an example implementation, all communication with the NMSP cloud is performed over the HTTPS or another secure protocol and authenticated. For example, the authentication can be performed using a globally unique machineId and authentication token generated by the endpoint agent itself. Also, to protect end-user privacy, HTTP body content and cookies can be removed from the HTTP Archive (HAR) data before leaving the browser memory space (e.g., metadata is retained).

In addition, in this example implementation, the domain whitelist downloaded during the check-in is encoded using a Bloom filter (e.g., false positives can be filtered in the NMSP cloud during upload) to prevent a potential attacker from retrieving a list of NMSP customers with verified domains.

User Space Proxy

In some enterprise environments, all HTTP traffic is routed through an authenticated HTTP proxy to access the Internet. When the authentication is based on the logged-in user, the system level account may not have access to the HTTP proxy which prevents the te-agent from executing as a system to connect to the NMSP cloud. To handle this case, in one embodiment, a User Space Proxy (USP) is used which is a binary that executes in the user space of the logged in users.

When one comes online, it contacts the endpoint agent and negotiates that it is able to proxy HTTP requests for the endpoint agent. In an example implementation, when the endpoint agent is to access the backend (e.g., NMSP cloud), the following checks are performed: (1) can the agent connect to the NMSP cloud directly or (if configured) via a network proxy; and (2) can the agent connect to the NMSP cloud via one of the USPs which will use the proxy and authentication configured on the user. In this example implementation, the agent is configured to prefer the above-described option for the agent to connect to the NMSP cloud directly or (if configured) via a network proxy, if possible. Further requests can be routed as determined by the above steps without checking the connectivity again. When the network state changes, the checks can be performed again.

Process Monitoring Using Endpoint Agents

In one embodiment, endpoint agents are configured to also perform process monitoring on endpoints. For example, endpoint agents can be configured to monitor for certain new processes (e.g., based on an association with a new socket open on the endpoint, which can be used to monitor various network connections including for non-web applications, such as connections between thin clients and a VDI server based on a process executed on the thin client for attaching to the VDI server). As another example, endpoint agents can be configured to monitor a specific type of process (e.g., a Skype process or another process), which can be performed to facilitate additional network layer-4 testing using endpoint agents. In addition, scheduled testing techniques as further described below can also be applied to perform these process monitoring techniques using endpoint agents.

Labels for Endpoint Agents

In one embodiment, endpoint agents are associated with labels (e.g., configurable and/or dynamic tags, such as to identify agents based on a current network, geographical location, and/or other criteria/state information associated with the endpoint or endpoint agent). For example, endpoint agents can be dynamically associated/tagged with labels based on a current network, location/geography, operating system (OS), current state information, and/or other runtime/state information associated with an agent/device, which can be used to schedule tests, visualization, live sharing, searching, and/or filtering data collected from the agents, in which labels are often associated with one or more network/endpoint properties.

As an example, assume that ACME Corporation has configured a label for endpoint agents identified as being located in the San Francisco office (e.g., based on a network associated with the endpoint agent, in which such is a dynamic label/tag based on the current network). In this example, scheduled tests can be directed to endpoint agents with a specified label (e.g., a scheduled HTTP test targeting SalesForce.com from agents associated with the San Francisco office (based on that label/tag), which will then be executed by endpoint agents if a given endpoint is in the San Francisco office at the specified time for the scheduled test, but would not be executed by endpoint agents if the endpoint is not currently connected to the network in the San Francisco office, such as for remote users who are working at home and/or users who are working from other offices of ACME Corporation).

Alerting, Detecting Events, and Reporting Using Endpoint Agents

In one embodiment, alerts are generated using the disclosed techniques for enterprise network monitoring using endpoint agents. For example, a wireless gateway latency or packet loss event can be detected using the disclosed techniques as further described below with respect to example use case scenario A. As another example, alerts can be configured to be generated based on one or more trigger notifications when a set of properties match a predefined criteria. Also, trigger notification criteria can also be based on endpoint agent labels (e.g., a configured alert can select to generate an alert if a signal quality drops below 65% based on aggregated agents/endpoints in a San Francisco office for ACME Corporation by selecting criteria for endpoint agents with a label of San Francisco endpoints, and automatic deactivation of alert logic, such as if returns to above 65%).

In one embodiment, event detection is performed using the disclosed techniques for enterprise network monitoring using endpoint agents. For example, a wireless gateway latency or packet loss event can be detected using the disclosed techniques as further described below with respect to example use case scenario A.

In one embodiment, reports are generated using the disclosed techniques for enterprise network monitoring using endpoint agents. For example, reports can provide aggregated data, such as over a period of time (e.g., 30 days, 90 days, and/or some other configurable period of time). In an example implementation, reports include summaries of agent performance data that is aggregated, such as network performance over time for capacity planning purposes or other network management purposes, and/or to monitor latency and network performance for access to a cloud service, such as Microsoft Office 365 or another cloud service, in which different report templates can be provided for different IT/network users (e.g., network admin users, IT help desk users, IT system admin users, and/or other types/categories of users).

Example Use Cases

FIG. 6 is an example network environment that shows example endpoint agent deployments in accordance with some embodiments. Referring to FIG. 6, the endpoint agents can be deployed in endpoints that access various networks as shown by an endpoint agent deployed on an endpoint accessing an enterprise branch network as shown at 602 and as shown by another endpoint agent deployed on another endpoint accessing a home network/public Hotspot network as shown at 604.

Example Use Case A

In this example use case A, ACME Corporation uses Salesforce.com and Office365 to manage its customers and internal documents. Some employees have reported long response times and sporadic unavailability issues with the external services. The IT/network administrator(s) are not able to reproduce the problem on their machine(s), but the employees keep complaining about these performance problems. Each of Salesforce.com and Microsoft (for Office365) reports that their respective services/systems are in good health and are not having any performance problems.

By using the disclosed techniques, ACME Corporation can deploy endpoint agents on the employees' machines (e.g., if not already deployed) and collect an aggregate view of the user experiences. By monitoring the user/endpoints as they use these services (e.g., Salesforce.com and Office365) and capturing the browser performance data they are actually seeing from the respective endpoints, the IT/network administrators are able to pinpoint the problem(s). For example, the problem(s) can be related to a wireless signal, a local gateway, a high CPU and/or memory usage on the end-user devices/endpoints, a proxy issue, a routing issue to the external service (e.g., Salesforce.com and Office365), a third-party service that Salesforce.com or Office365 is dependent on (e.g., a Content Distribution Network (CDN) provider), a packet loss between the organization network and the SaaS, and/or various other network and/or system related problems as similarly described above.

Figure 7:
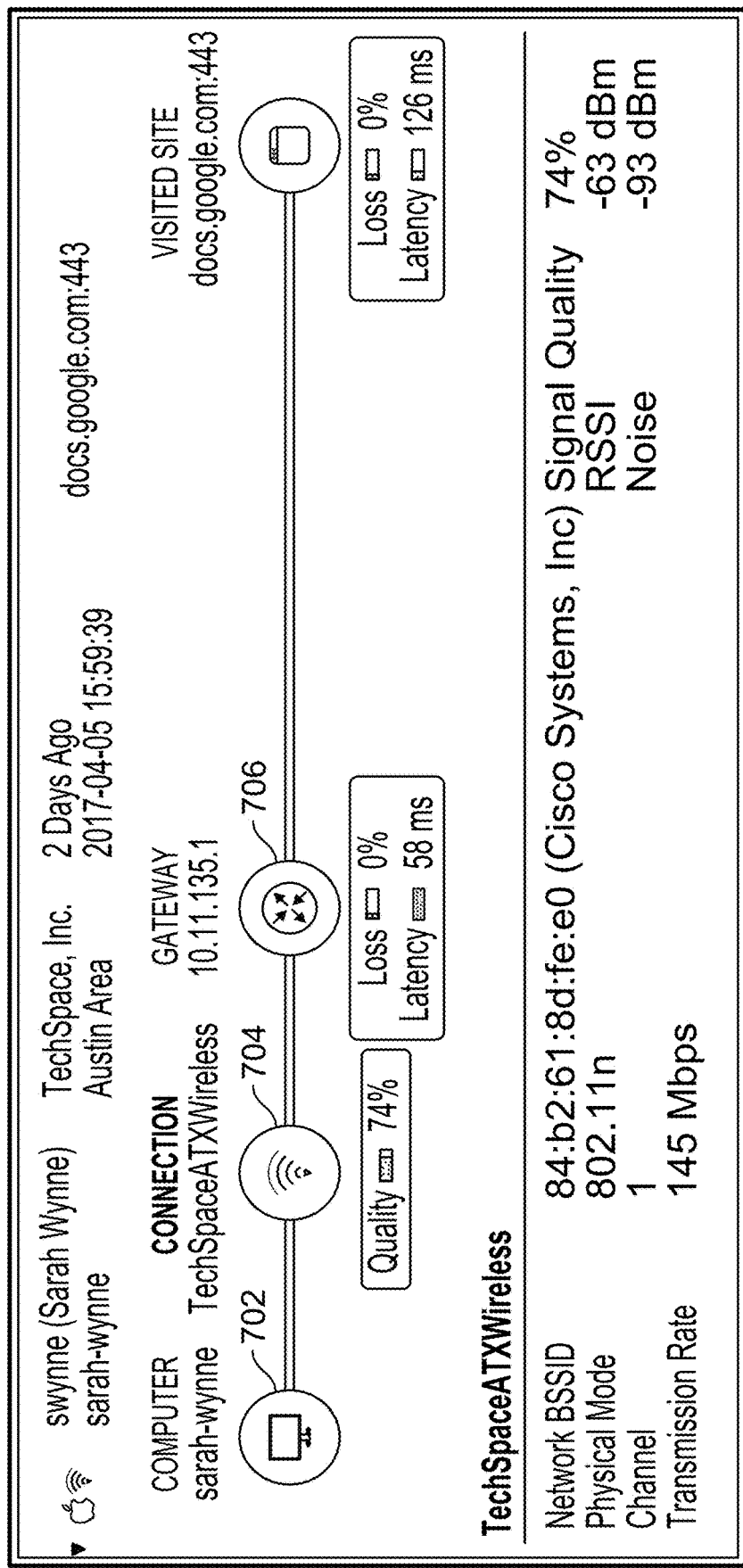
FIG. 7 is a graphical visualization that illustrates a high latency problem from an endpoint to a gateway via a wireless link that is identified using the disclosed techniques in accordance with some embodiments.

FIG. 7 is a graphical visualization that illustrates a high latency problem from an endpoint to a gateway via a wireless link that is identified using the disclosed techniques in accordance with some embodiments. In this example, the endpoint agent testing indicates that there is a high latency from an endpoint 702 via a wireless link 704 to a gateway 706 as shown in FIG. 7. As similarly described in the above example use case scenario, the endpoint agent collected data results can be used by IT/network admin(s) for ACME Corporation to identify/troubleshoot the performance problems (e.g., as due at least in part to this packet loss problem) experienced by users for various services, such as Salesforce.com and/or Microsoft Office365.

Figure 8:
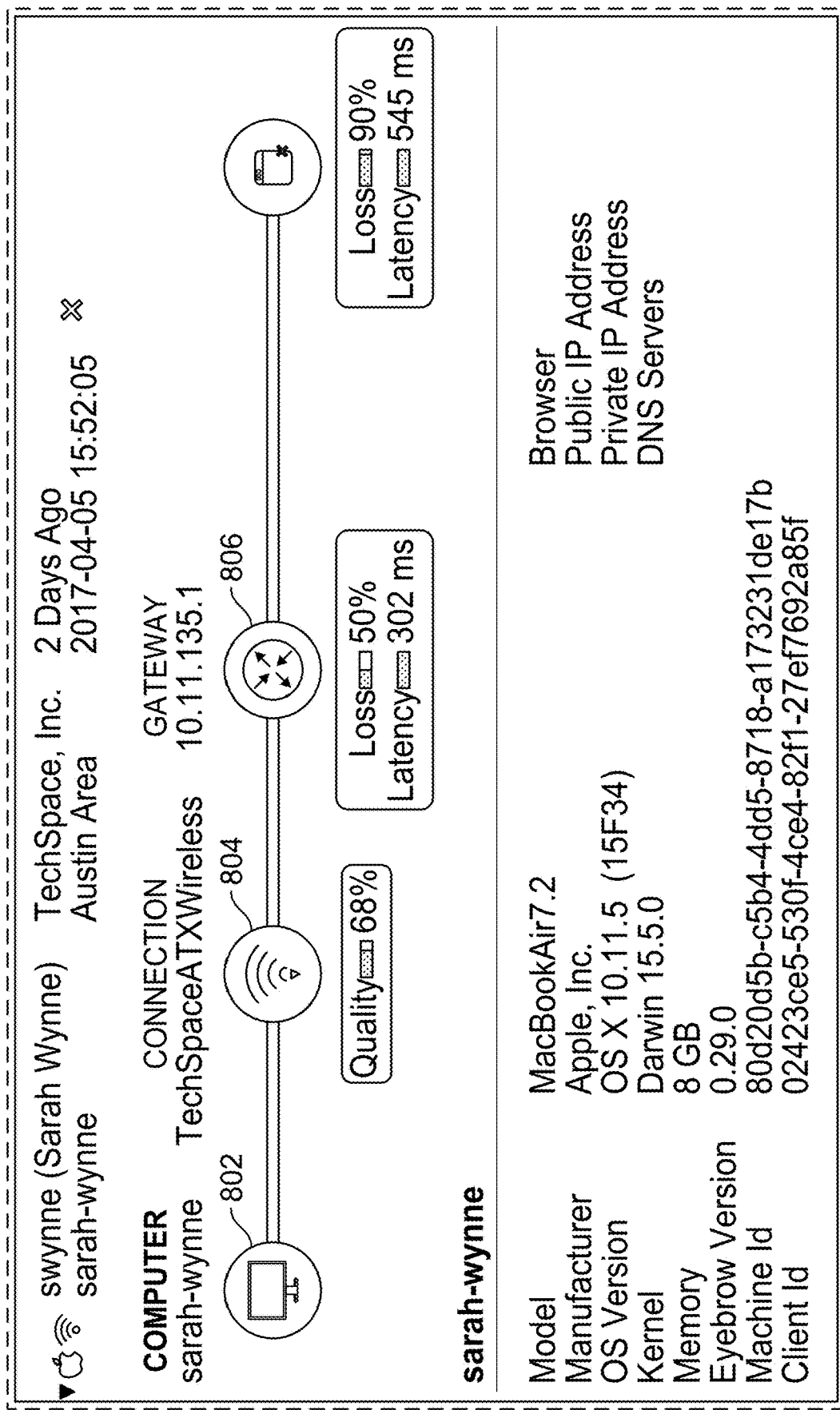
FIG. 8 is a graphical visualization that illustrates a packet loss problem from an endpoint to a gateway via a wireless link that is identified using the disclosed techniques in accordance with some embodiments.

FIG. 8 is a graphical visualization that illustrates a packet loss problem from an endpoint to a gateway via a wireless link that is identified using the disclosed techniques in accordance with some embodiments. In this example, the endpoint agent testing indicates that there is a high packet loss from an endpoint 802 via a wireless link 804 to a gateway 806 as shown in FIG. 8. As similarly described in the above example use case scenario, the endpoint agent collected data results can be used by IT/network admin(s) for ACME Corporation to identify/troubleshoot the performance problems (e.g., as due at least in part to this packet loss problem) experienced by users for various services, such as Salesforce.com and/or Microsoft Office365.

Figure 9:
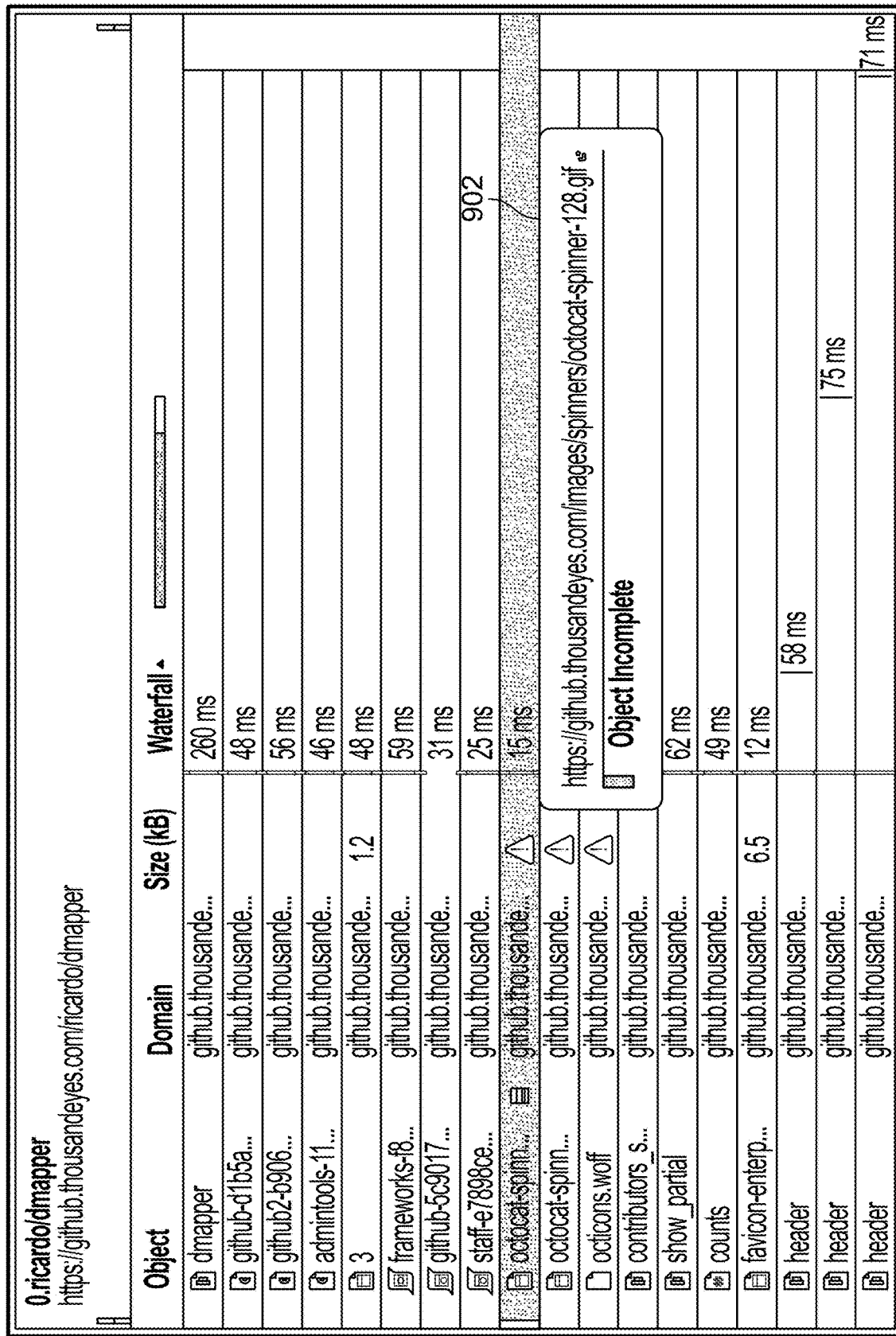
FIG. 9 is a graphical visualization that illustrates incomplete components on a web page problem that is identified using the disclosed techniques in accordance with some embodiments.

FIG. 9 is a graphical visualization that illustrates incomplete components on a web page problem that is identified using the disclosed techniques in accordance with some embodiments. In this example, the endpoint agent testing indicates that there are incomplete components on a web page problem as shown at 902 in FIG. 9. As similarly described in the above example use case scenario, the endpoint agent collected data results can be used by IT/network admin(s) for ACME Corporation to identify/troubleshoot the performance problems (e.g., as due at least in part to this incomplete components on a web page problem) experienced by users for various services, such as Salesforce.com and/or Microsoft Office365.

Example Use Case B

In this example use case B, ACME Corporation has branch offices in different geographical locations across the United States (e.g., in Miami, Fla. and in the San Francisco Bay Area in California), and is hosting an internal system at the headquarters. The branch offices are connected to the headquarters via VPN network connections. Further, ACME Corporation can have multiple employees working from home and working remote while on the road/business travel who are also connecting via VPN network connections. In this example, employees working from home are reporting that the internal system/service is unavailable at times and it is affecting their productivity. As each home office is unique and uses a variety of ISPs, it is difficult for the IT/network administrator(s) to pinpoint the problem(s).

By using the disclosed techniques, ACME Corporation can deploy endpoint agents to the employees' machines (e.g., if not already deployed) for the employees who are working from home and can collect an aggregate view of the user experiences for each of these remote users. As such, the IT/network administrator(s) can collect data reporting the system and network performance associated with each of these endpoints and their respective connectivity to the internal system/service. For example, this collected performance data from the endpoint agents can include home wireless signal quality, VPN connection to the headquarters, system load for each of the endpoints, Internet Service Provider (ISP) issues (e.g., packet loss, routing, high latency, and/or other network performance issues associated with the ISP's network), and the availability of the internal system/service itself.

Additional Embodiments of Scheduled Tests for Endpoint Agents

In some embodiments, endpoint agents are configured to perform scheduled tests using various techniques further described below. In an example implementation, scheduled tests can be configured by an IT/network admin and distributed to deployed agents using an agent controller, such as further described herein.

For example, endpoint agents can be configured to perform scheduled tests based on user triggered events, and, in this example, agents can perform extra tests and capture data for test results based on the user triggered events. As another example, endpoint agents can be configured to perform scheduled tests in order to perform periodic network infrastructure tests. Example periodic network infrastructure tests can include path network tests, DNS tests, HTTP tests, and/or other network infrastructure tests. As yet another example, endpoint agents can be configured to perform scheduled tests based on a label(s) in which agents check-in periodically and/or based on network change at which point the agent controller can determine labels for such agents and which if any tests to be scheduled based on labels. These and other examples for scheduled tests for endpoint agents will be further described below with respect to various embodiments.

Overview of Scheduled Test Process Using Endpoint Agents

In an example implementation, scheduled tests for endpoint agents can be configured to execute tests (e.g., scheduled tests) in specific intervals from each end-user's environment directly (e.g., from the desktop/laptops where the endpoint agents have been deployed). In this example implementation, unlike cloud and enterprise agents, the set of endpoint agents where those tests are executed is dynamically assigned based on a set of conditions provided by, for example, the customer, in a test configuration as will be further described below. In this example test configuration, the endpoint agents that have both a capacity and a state that match the specified condition(s) in the test configuration will be assigned to execute the scheduled test(s). As such, the set of agents that execute the scheduled test(s) can fluctuate over time based on several factors, such as agent availability (e.g., agent online availability) and a reported state of such agents, as will be further described below.

Figure 10:
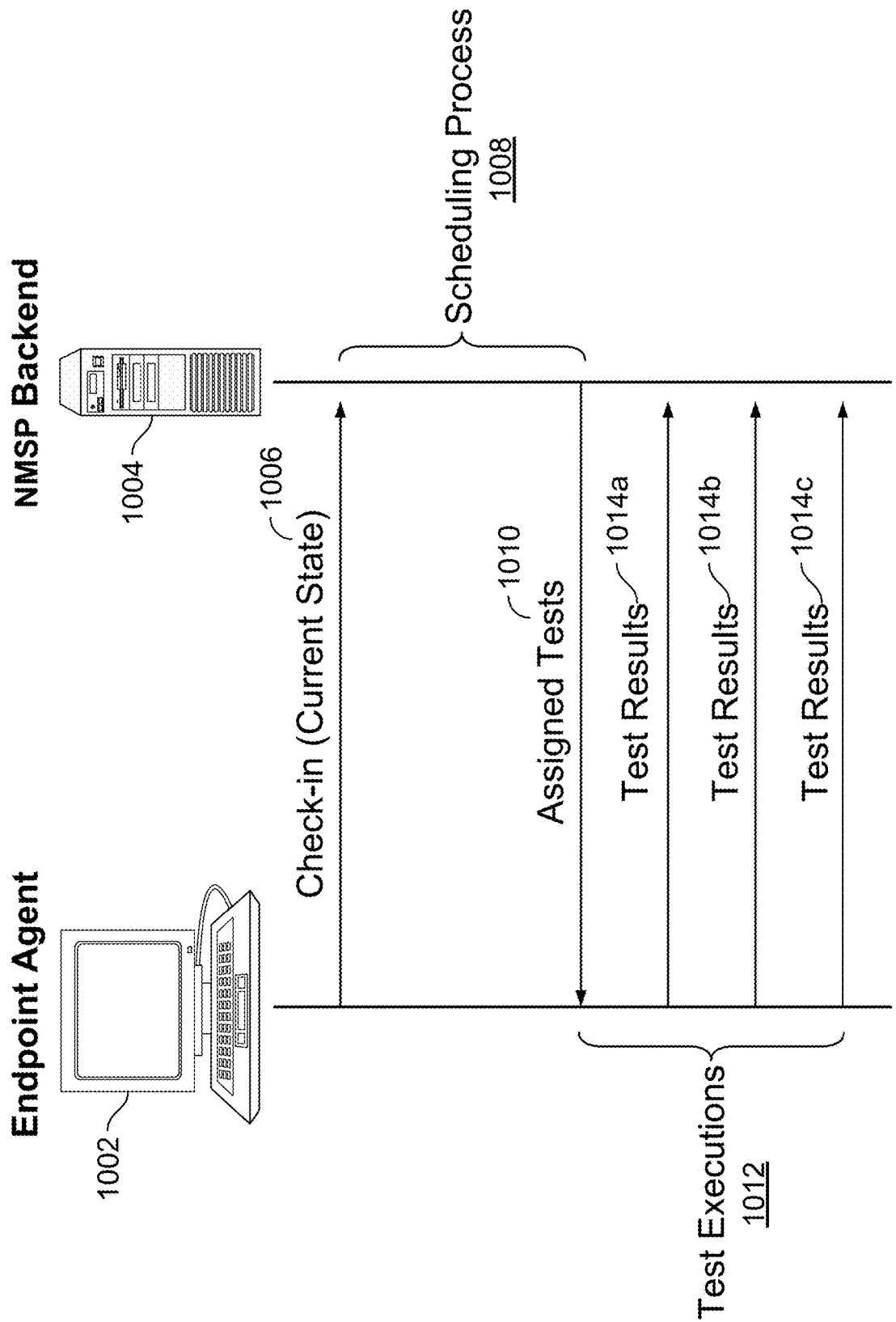
FIG. 10 illustrates an overview of a scheduled test process for endpoint agents in accordance with some embodiments.

FIG. 10 illustrates an overview of a scheduled test process for endpoint agents in accordance with some embodiments. As shown, FIG. 10 provides a high-level view of an example process for configuring and executing scheduled tests on endpoint agents.

Referring to FIG. 10, an endpoint agent 1002 performs a check-in to a Network Monitoring Service Provider (NMSP) backend 1004 with its current state (e.g., periodically or when the endpoint agent detects a state change(s)) as shown at 1006. In another embodiment, the NMSP polls one or more of the endpoint agents to request/obtain a current state or other information associated with the endpoint agents (e.g., push and/or pull notification mechanisms can be implemented for communicating the current availability/state updates between the endpoint agents and the NMSP backend). For example, the endpoint agent can be implemented as similarly described above with respect to FIG. 4, or in other implementations, the endpoint agent can be implemented as an agent executed that does not require a browser extension implementation (e.g., in contrast to a mode of endpoint agent operation where data collection is triggered by a user browsing with a web browser, such as the Google Chrome web browser or the Microsoft Internet Explorer® web browser, the disclosed scheduled endpoint tests do not require such a browser extension for the endpoint agent to be installed). The NMSP backend can be implemented as similarly described above with respect to FIG. 1.

The check-in of the endpoint agent with its current state check-in communication with the NMSP backend triggers a scheduling process 1008 as shown in this example infrastructure implementation. Next, based on the current assignments, the machine state, and the tests to be assigned based on a test configuration, one or more tests are assigned to the endpoint agent as shown at 1010. The endpoint agent performs test executions at 1012 of each of the assigned tests based on the test configuration and then returns the test results to the NMSP backend as shown at 1014a, 1014b, and 1014c (e.g., after the test results are obtained from the execution of each of the assigned tests, they can then be pushed to the NMSP backend, in which test results of one or more tests can be pushed to the NSMP backend). In an example implementation, a test remains assigned to the endpoint agent until either (i) a new check-in event occurs that triggers another scheduling process to remove the test assignment from the agent or (ii) if the agent fails to check-in after a predetermined period of time (e.g., which can be a configured timeout period).

Scheduled Tests on an Endpoint Agent from a Customer's Perspective

From a customer's perspective (e.g., a subscriber of the network monitoring service provider's services), their computing environment includes a collection of individual endpoints whose environment and connectivity generally can change over time and may be highly volatile. As such, as compared with testing using Enterprise/Cloud agents, specifying a set of endpoint agents for executing scheduled tests can be technically challenging given that the environment of various individual endpoints and their connectivity can generally change over time as similarly discussed above.

Accordingly, in some embodiments, performing scheduled tests for endpoint agents includes receiving a test configuration that includes a set of conditions for matching one or more endpoint agents, receiving state information for a set of endpoint agents, determining which (if any) of the set of endpoint agents match the set of conditions in the test configuration to select one or more matching endpoint agents, and assigning one or more tests to the matching endpoint agents for execution of the scheduled tests based on the test configuration.

For example, the set of conditions in the test configuration can include various static properties associated with the endpoint agents (e.g., version of the agent, operating system (OS) installed on the endpoint, OS version installed on the endpoint, applications installed on the endpoint, versions of the applications installed on the endpoint, agent ID, and/or various other static properties associated with the endpoint agents) as well as dynamic properties associated with the endpoint agents (e.g., wireless network connected to the endpoint, public IP being used by the endpoint to access the Internet, geographical location of the endpoint, and/or various other dynamic properties associated with the endpoint agents).

In an example implementation, the set of conditions is referred to as a label that can be applied for selecting the subset of matching endpoint agents based on the set of conditions. Specifically, the label is the assignment criteria that the customer uses to specify the subset of endpoint agents to be selected for executing the scheduled tests. In this example implementation, customers can also configure an upper bound on the number of endpoint agents that can be assigned to a particular test (e.g., setting such a limit on the number of endpoint agents that will be selected to execute the scheduled tests can be implemented to avoid having, for example, all of the endpoint agents perform the scheduled tests in a scenario in which all of the endpoint agents match the label/assignment criteria). As such, the individuality of agents is effectively superseded by a group of matching agents that are automatically selected based on the label/assignment criteria in the configured test conditions to facilitate an efficient and effective solution for performing scheduled tests using endpoint agents as will now be further described below.

Assignment Mechanism for Scheduled Tests for Endpoint Agents

In one embodiment, the assignment of scheduled tests to agents is performed for an endpoint agent using an assignment mechanism to facilitate an efficient and effective solution for performing scheduled tests using endpoint agents as will now be further described. In an example implementation, the assignment mechanism (e.g., implemented by the NMSP backend, such as shown in FIG. 10) processes endpoint agent state information at a given time (e.g., periodically) to determine which tests it should be assigned to based on the constraints of its current state and the current system's state (e.g., the current assignment table, test configurations, etc.). In this example implementation, as agents go through the assignment process, a given scheduled test is a candidate test that will potentially be assigned to one or more of the set of agents based on the label/assignment criteria.

Example Triggers of the Assignment Mechanism

The assignment mechanism for scheduled tests for endpoint agents is an event-driven mechanism. In this example implementation, there are several trigger events (e.g., and fewer and/or additional combinations of triggers can be similarly implemented) that lead to changes in the scheduled test assignment set as will now be described.

Endpoint Agent Check-in Event

The check-in event is triggered after the endpoint agent performs the following operations: (i) communicate to the NMSP backend that the endpoint agent is alive and executing; and (ii) communicate the current state it has detected while executing on the endpoint. Through the check-in process, the NMSP backend generally receives the relevant information from the endpoint agent to determine the assignment conditions that can be processed and applied to trigger the potential assignments of one or more of the scheduled tests to the endpoint agent.

In this example, the check-in events are driven by the endpoint agents and are based on the following criteria: (i) at the endpoint agent's startup; (ii) at a specific time interval (e.g., a configurable period of time/interval, such as every 3 minutes, 30 minutes, 1 hour, or some other time period); and (iii) when the endpoint agent detects that there has been a change in its current state.

Machine Offline Event

The machine offline event is triggered after a predetermined amount of time has passed since an endpoint agent has last checked in to the NMSP backend (e.g., a configurable time-out period, such as 3 minutes, 30 minutes, 1 hour, or some other period of time). The machine offline event is used to detect that a given endpoint agent is offline (e.g., the endpoint agent is unavailable, which can be the result of the endpoint being powered down, the endpoint is not in communication with the Internet, the agent is not executing on the endpoint, etc.) and triggers the de-assignment of scheduled tests for that given endpoint agent.

Test Configuration Change Event

The test configuration change event is triggered when, for example, a customer changes the configuration for a particular scheduled test. The consequence of the test configuration change event is to remove all the agents assigned to the scheduled test that has changed.

Label Definition Change Event

When the definition of a label changes, the label definition change event is triggered. The consequence of the label definition change event is to remove all assignments from the scheduled tests that are associated with the label that has changed.

Agent to Test Assignment Mechanism—Test Scheduler Architecture

Figure 11:
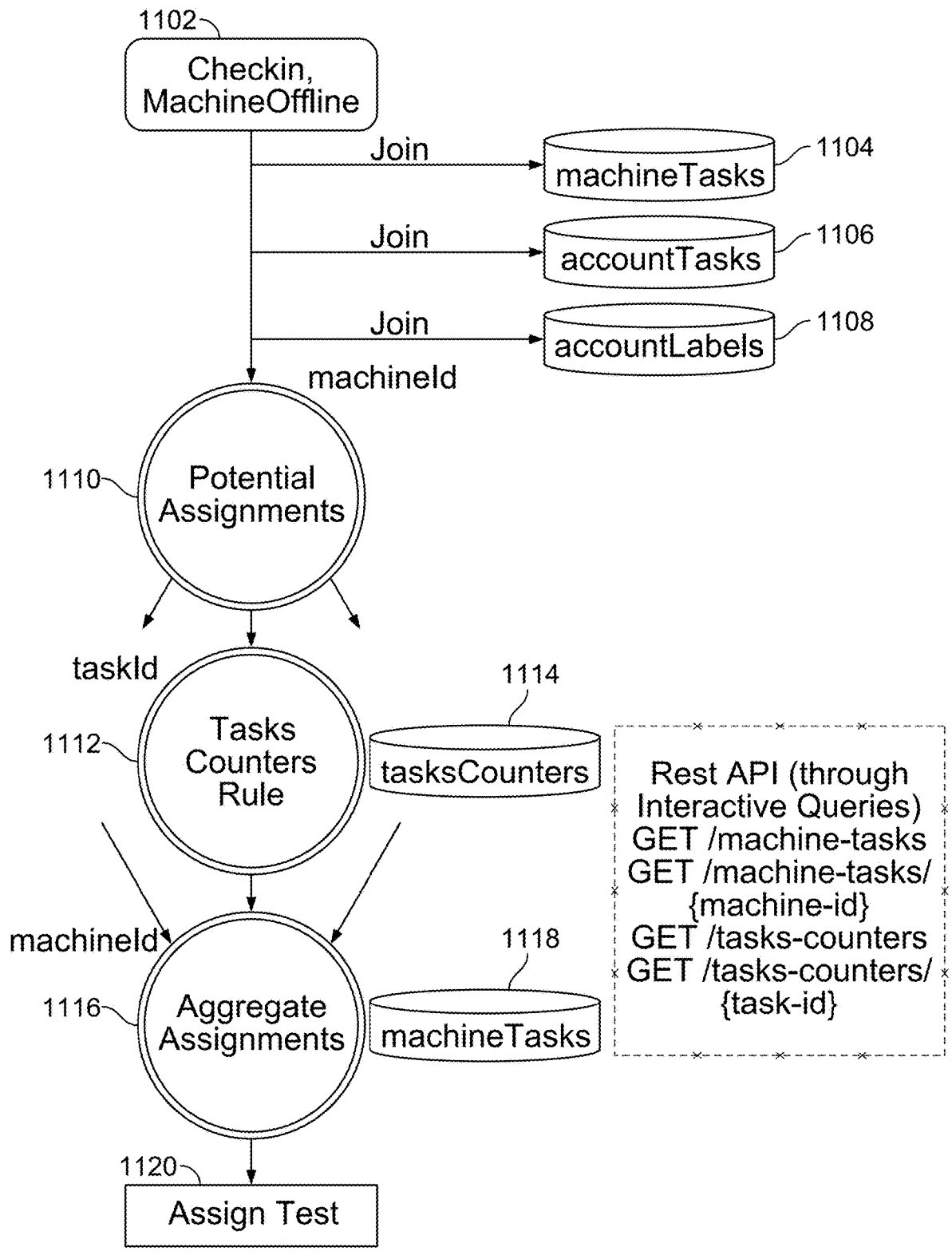
FIG. 11 is a functional block diagram of an architecture of a test scheduler for endpoint agents in accordance with some embodiments.

FIG. 11 is a functional block diagram of an architecture of a test scheduler for endpoint agents in accordance with some embodiments. The test assignment process includes a test scheduler, such as shown in FIG. 11 as will now be described.

Referring to FIG. 11, the test scheduler receives the following elements as input: (i) an endpoint agent's check-in (e.g., current agent state) as shown at 1102 (e.g., an agent periodically performs a check-in that provides information associated with the endpoint agent's state that can be processed and stored as similarly described above and further described below, otherwise, the machine offline event is triggered as also similarly described above); (ii) current test assignment(s) are joined with a machineTasks data store 1104; (iii) tests configurations including the label that is used to match for potential tests based on tests configurations are joined with an accountTasks data store 1106 (e.g., including the number of agents to be assigned to each test); and (iv) a system's label information is joined with an accountLabels data store 1108 (e.g., the labels include the various criteria that can be used as a test assignment condition as similarly described above).

The test scheduler generates as output a new test assignment(s) for the endpoint agent as shown at potential assignments 1110. For example, the test scheduler processing output result can be either new tests assigned to the endpoint agent or tests de-assigned from the endpoint agent, or in some cases, no new tests are assigned to the endpoint agent and no tests are de-assigned from the endpoint agent. In this example, any new test assignment(s) will conform to the restrictions that are expected from the test assignment set. These include: (i) a maximum number of agents assigned for a single test that is determined using a tasks counters rule per taskId as shown at 1112 and a taskCounters data store 1114; (ii) a maximum number of tests assigned for a single endpoint agent that is determined using an aggregate assignments counter per machineId as shown at 1116 and a machineTasks data store 1118; and (iii) each test-agent assignment conforms to the following rule: test's assignment condition is true for the agent's current state.

As such, in this example implementation, the test scheduler uses the stream of check-in events generated by each of the endpoint agents (e.g., as shown at 1102), performs the matching between the label assigned to the test and the current agent state retrieved from the endpoint agents' check-in state information, and creates a list of potential test assignments (e.g., as shown at 1114). After this phase the scheduler checks if test execution slots are still available for the given test (e.g., as shown at 1112 and 116), and if so, the final assignment of a matching scheduled test to a given endpoint agent is performed as shown at 1120. When the endpoint agent contacts the NMSP backend (e.g., the control plane of the NMSP backend) to fetch the list of tests to execute, the NMSP backend will use the assigned tasks data store (e.g., machineTasks data store 1118) created by the test scheduler to generate the list of tests that should be executed by the endpoint.

Execution of Assigned Scheduled Tests by the Endpoint Agent

The execution of the assigned scheduled tests will now be described in the context of the endpoint agent. In this example implementation, the execution of the assigned scheduled tests is performed in each of the endpoint agents that were assigned to execute a given scheduled test (e.g., and such test executions are isolated across the endpoint agents (either of different or a same customer account)). When the test specifications are received at the endpoint agent, the endpoint agent internally schedules the tests to be executed at the intervals specified in their metadata. As these deadlines happen, the scheduled tests are executed in the way specified in their configuration.

For example, each execution can generate a single data-point that has information to facilitate the following: (i) identify the test it belongs to; (ii) determine what exact version of the test configuration was used to execute the test; and (iii) determine which time slot or round the data point belongs to. In this example when a data-point is generated, it is then uploaded to the NMSP backend (e.g., an endpoint agent Ingress subsystem, such as further described below) for ingestion leading to the data point being displayed in different ways from the disclosed NMSP platform (e.g., as shown in FIG. 1).

In an example implementation, the ingress subsystem is responsible for processing and storing data-points produced by the endpoint agents. This subsystem implements a decoupled event-driven architecture that uses a messaging streaming platform to connect each subcomponent to perform the following operations: (i) enrich each data-point with additional information about the IPs collected by querying external services like WHOIS and DNS records; (ii) determine the endpoint agent location using the list of wireless access points; (iii) store the processed data-point in a long term storage component/element; and (iiii) index the processed data-point for fast querying on a secondary storage.

Test Assignment Management

In an example implementation, the test configuration in the case of an endpoint agent resides completely in memory (e.g., there is no permanent storage of this type of data on the endpoint). In this example implementation, avoiding permanent storage of the test configuration data on the endpoint facilitates the following: (i) test configurations may contain sensitive information and, as this type of agent deployment does not guarantee the customer full control of where they are deployed, this test configuration information could be leaked more easily if it were to be stored on the endpoint; and (ii) as the tests to run from an endpoint agent are generally related to its current state, permanent storage of the test configuration data could lead to consistency issues between the tests that should be executed with the stored tests.

As described above, the configuration retrieval is implemented using an event-driven mechanism. As such, new scheduled test assignments are triggered after the agent has checked-in with its current state (e.g., in the above-described implementation, the endpoint agent retrieves the test configuration assigned to it after some time has passed since its last check-in event).

If the endpoint agent is not able to communicate with the NMSP backend to perform a check-in, then the endpoint agent is configured to wait a predetermined amount of time before retrying. In this example, the endpoint agent discards the current test configuration assigned to it in the following scenarios: (i) the agent's conditions change, thus making the current test configuration potentially invalid; and (ii) a predetermined period of time (e.g., one hour or another configurable period of time) has passed since the last check-in event.

Execution Scheduling within the Endpoint Agent

In an example implementation, when an endpoint agent receives the tests (e.g., including metadata for the tests) that it has been assigned to execute, the endpoint agent distributes the assigned tests to different sets, each set corresponding to a different execution interval (e.g., 60-second, 120-second, etc.). Each of the sets is scheduled to execute at their respective interval. When the time to execute arrives, an evaluation is performed to determine whether the endpoint agent is able to execute that set of tests (e.g., if the endpoint agent is still executing and in communication with the Internet, etc.). This evaluation also includes calculating an estimate of the time to execute that set of tests. If the endpoint agent determines that the estimate of the time to execute that set of tests is longer than the interval time (e.g., executing that set of tests, if start execution start execution at X±tolerance, will take longer than the frequency that they should be executed, such as a 60-second interval or another configured interval, such as a set of tests that would not be able to finish within that round if that set of tests generally requires about 30 seconds to execute but does not start execution within 30 seconds in that given round), then the execution of that set of tests for that round will be skipped.

Managing the scheduled tests to perform at the configured interval can present technical challenges as well given the computing and network availability resources on a given endpoint machine. Each execution at a configured interval is associated with a round. For example, this can be problematic, because the endpoint agent attempts to associate the execution to a round, which is the previous interval delimitation mark. (e.g., a 60-second test executed at 12:11:30 is associated with the 12:11:00 round). If a test was scheduled to execute at the beginning of the round, it can actually start at the end of the previous round generating incorrect data. As such, in this example implementation, the endpoint agent includes controls to detect such cases and re-schedule the execution at a later time when the round has actually started. In this example, the test results are considered successful if they finish executing within the round they are associated with. Otherwise, the test results are discarded. As such, this means that a 60-second interval test should start and finish in each bounded period (e.g., 00:00:00-00:01:00).

In an example implementation, to ensure data-points are collected with the correct timestamp and associated with the correct round when the endpoint agent checks in, the NMSP backend will send his current UNIX timestamp, if a configurable time difference is recorded, the endpoint agent will apply the difference between the UNIX timestamp sent by the NMSP backend and the current time reported by endpoint agent's operating system (e.g., the OS executing on that endpoint device). After all of the tests for an interval are executed and validated, the test results (e.g., data points that are generated) are forwarded to the uploading mechanism for eventual upload to the NMSP backend as will now be further described.

Upload Mechanism for Communicating the Endpoint Agent Test Results to the NMSP Backend In an example implementation, the upload mechanism (e.g., upload subsystem of the endpoint agent) includes a buffer with a permanent storage backed up subsystem implemented by the endpoint agent. When new data (e.g., including test results) is sent to the upload subsystem, the upload subsystem stores the test results to permanent storage on the endpoint (e.g., disk or other permanent storage on the endpoint machine). Storing the test results to permanent storage on the endpoint generally ensures that independent of the network and server-side conditions at the time, the test results (e.g., data points) will eventually be uploaded (e.g., or in some cases, discarded due to being too old as further described below).

In this example implementation, when there are test results (e.g., data points) in the queue to be uploaded, the upload subsystem of the endpoint agent will attempt to upload the test results to the NMSP backend through a particular endpoint whose purpose is to receive scheduled test results. The available test results (e.g., data points) are uploaded in batches of a configurable size(s). The test results (e.g., data points) are uploaded in the chronological order that they were generated (i.e., older data points are uploaded first).

There are two ways in which the test results (e.g., data points) can be deleted from the upload subsystem of the endpoint agent (e.g., and its permanent storage). The first way is due to a successful upload. For example, after a data point is deemed to have been successfully uploaded, it is removed from the upload subsystem. The second way is that the data point was not successfully uploaded after a certain period of time. For example, data points that could not be uploaded after 24 hours (e.g., or another configurable period of time) from being generated are deemed too old and discarded by the upload subsystem.

In case the system (e.g., endpoint machine) is shutdown (e.g., either normally or abnormally), the pending uploads will be loaded from permanent storage when the system is restarted, and the upload subsystem will then attempt to complete such pending uploads unless they are deemed too old in which case such will be discarded by the upload subsystem.

Example Test Types Performed by the Endpoint Agents

In one embodiment, the endpoint agents can perform various types of tests using the disclosed techniques for scheduled tests for endpoint agents. For example, the endpoint agents can perform various network tests (e.g., the network test can include several components that provide information regarding the network topology, its state, and health regarding the given target) as described herein. As another example, the endpoint agents can perform various HTTP tests (e.g., the HTTP tests can send a request to an HTTP server whose characteristics are configured by the client on a per-test basis) as described herein. Also, along with the HTTP request, a network test can be issued at the same time to gather data points from the connectivity domain.

Creating Scheduled Tests for Endpoint Agents

As similarly described above, endpoint tests are tests that execute on endpoint agents at regularly scheduled intervals. For example, users (e.g., NMSP customers, such as network administrators and/or Information Technology (IT) administrators of such customers) can create HTTP server tests and network tests (e.g., agent to server tests), including the dynamic assignment of tests to endpoint agents based on various configurable criteria/labels as described herein (e.g., unlike cloud and enterprise agents, endpoint agents are not typically online at all times; as such, to address this technical challenge and to maximize the amount of test data to be collected and evaluated, test assignment to specific endpoint agents is a dynamic assignment process as disclosed herein with respect to various embodiments). These tests execute without user interaction and execute as long as an endpoint agent is online, providing data from, for example, remote workers' machines, home workers' machines, and/or smaller branch offices' machines (e.g., end-user machines, such as tablets, laptop computers, desktop computers, and/or other network capable computing machines).

Test Creation

In one embodiment, creating a scheduled endpoint agent test includes the following operations. First, select which endpoint agents, and how many endpoint agents should perform the test. Second, create a label that includes the desired endpoint agents. Third, assign the label to your test and specify the maximum number of endpoint agents that may perform the test concurrently. Fourth, select the test type, target, and interval. Fifth, review advanced settings prior to completion. Each of these operations will be further described below.

Dynamic Agent Assignment Using Labels

Figure 12:
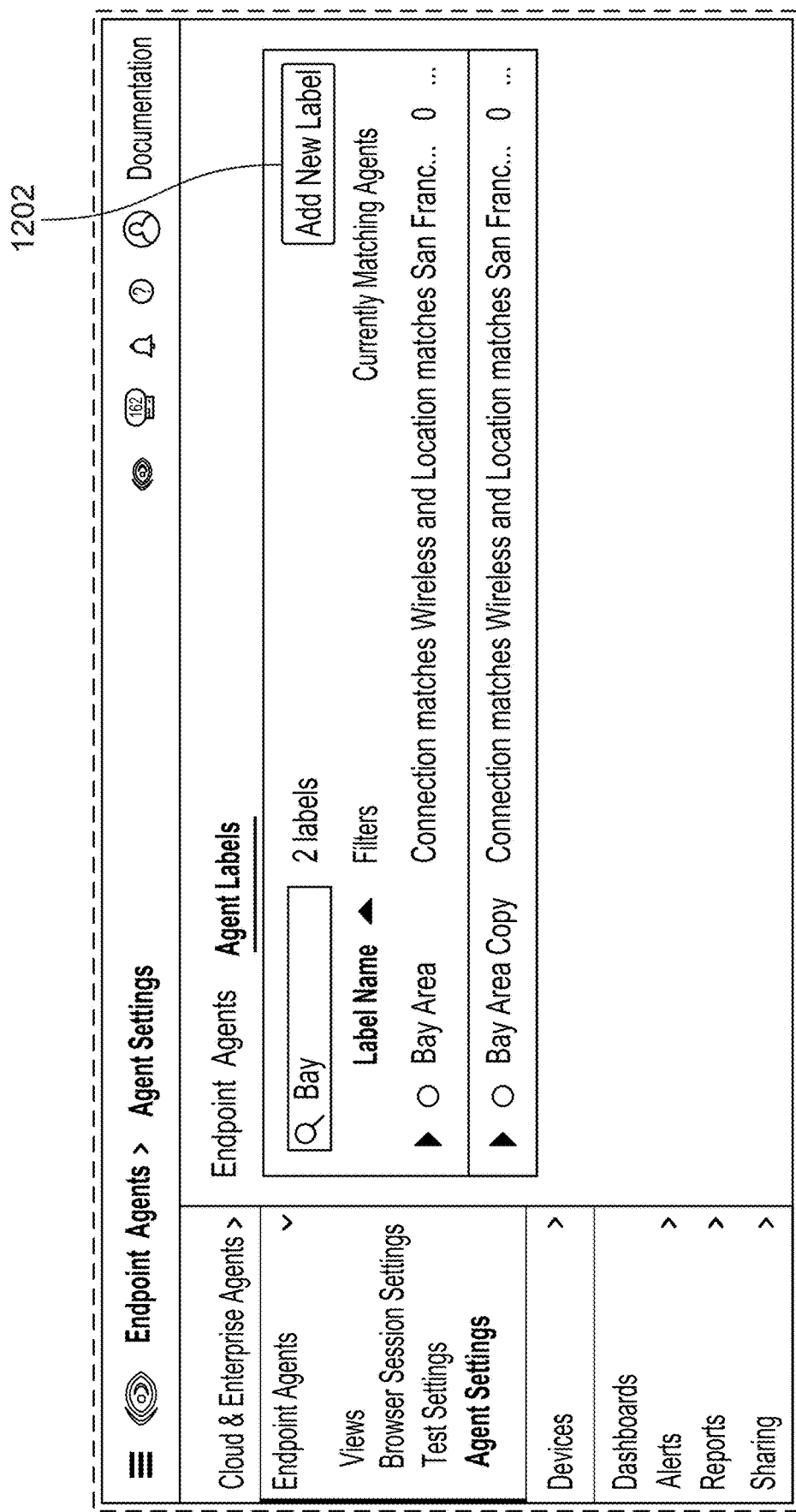
FIG. 12 is a screen diagram for adding a new label for dynamic assignment of scheduled tests to endpoint agents in accordance with some embodiments.

FIG. 12 is a screen diagram for adding a new label for dynamic assignment of scheduled tests to endpoint agents in accordance with some embodiments. In contrast to tests running on cloud or enterprise agents where tests are assigned to agents statically, a scheduled endpoint agent test is assigned to endpoint agents using an endpoint label whose filter criteria match the endpoint agents.

Because endpoint agents are deployed on endpoints (e.g., machines, such as workstations or other types of network capable computing devices) that may frequently or sometimes be offline, and because the network address, location, and/or other characteristics of the host/endpoint can change, test assignment is dynamically performed. In an example implementation, whenever an endpoint agent checks in with the NMSP backend, the criteria of each endpoint agent label is compared to the agent's information, such as network and geographic location. If the agent matches a label, any test configured with that label is assigned to the agent, up to a configurable maximum number of tests.

Figure 13:
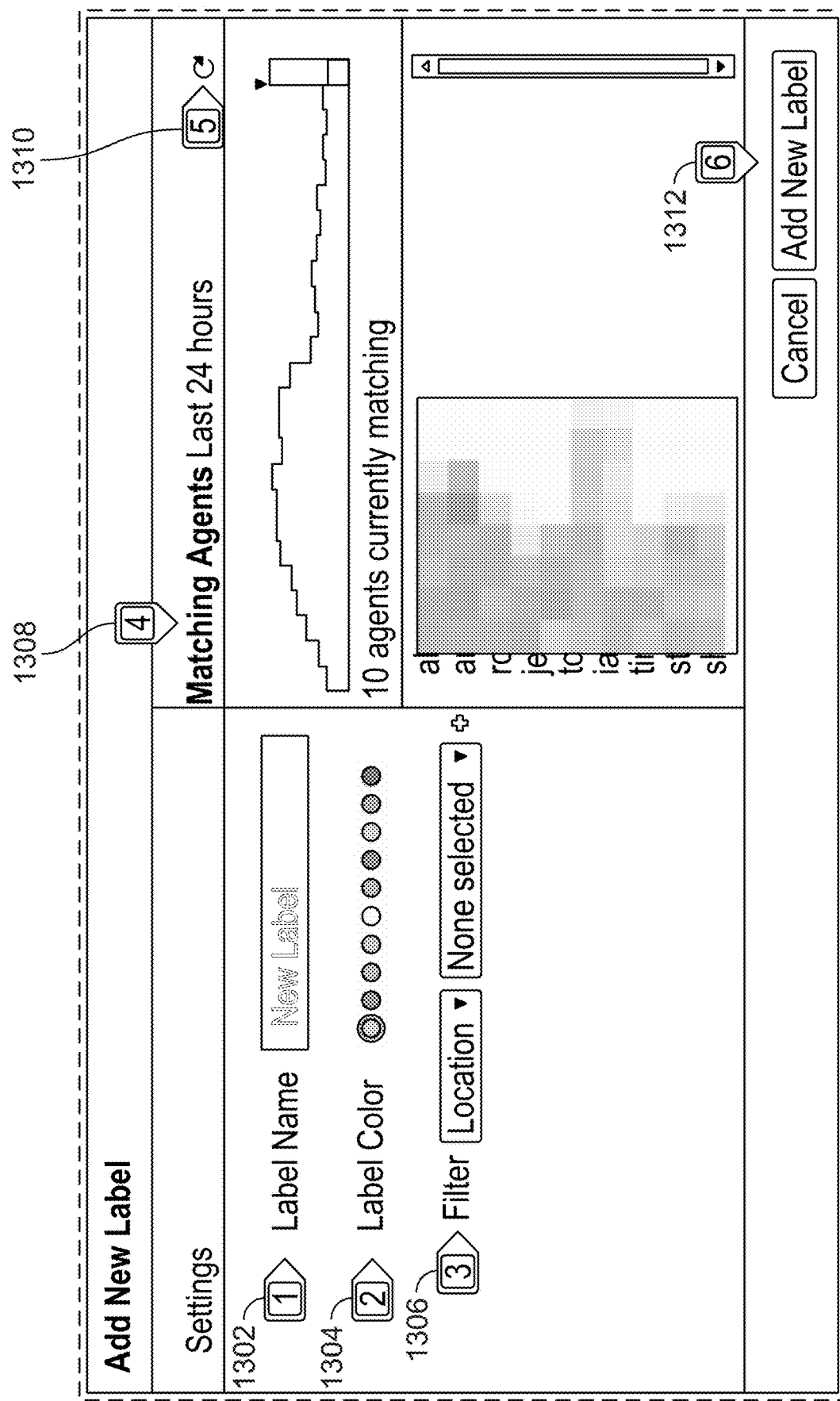
FIG. 13 is a screen diagram of a new endpoint agent label creation dialog for configuring labels for dynamic assignment of scheduled tests to endpoint agents in accordance with some embodiments.

Referring to FIG. 12, to create a new Endpoint Agent Label, head to the Agent Labels tab, under the Agent Settings page, and click on the Add New Label button 1202, and the new endpoint agent label creation dialog window will appear as shown in FIG. 13, which will now be described.

FIG. 13 is a screen diagram of a new endpoint agent label creation dialog for configuring labels for dynamic assignment of scheduled tests to endpoint agents in accordance with some embodiments. Referring to FIG. 13, a user can enter the Label Name (1) as shown at 1302, select the Label Color (2) as shown at 1304, and use the Filter (3) setting as shown at 1306 to select the criteria that will determine which endpoint agents execute a test with this label. In this example implementation, if multiple filters are selected, the endpoint agent matches the label if the endpoint agent matches all criteria (logical AND), and if so, the endpoint agent will be assigned this label. On the right side of the dialog, there is a graph showing the number of Endpoint Agents matching the filter criteria in the last 24 hours (4) as shown at 1308. The graph can be refreshed with a click (5) as shown at 1310. Once a user is satisfied with the label configuration, the user can click on the Add New Label button (6) as shown at 1312 to complete the label creation process. Once the endpoint agent label has been configured, the user can then proceed to the test creation as will now be described.

Creating a Scheduled Test

Figure 14:
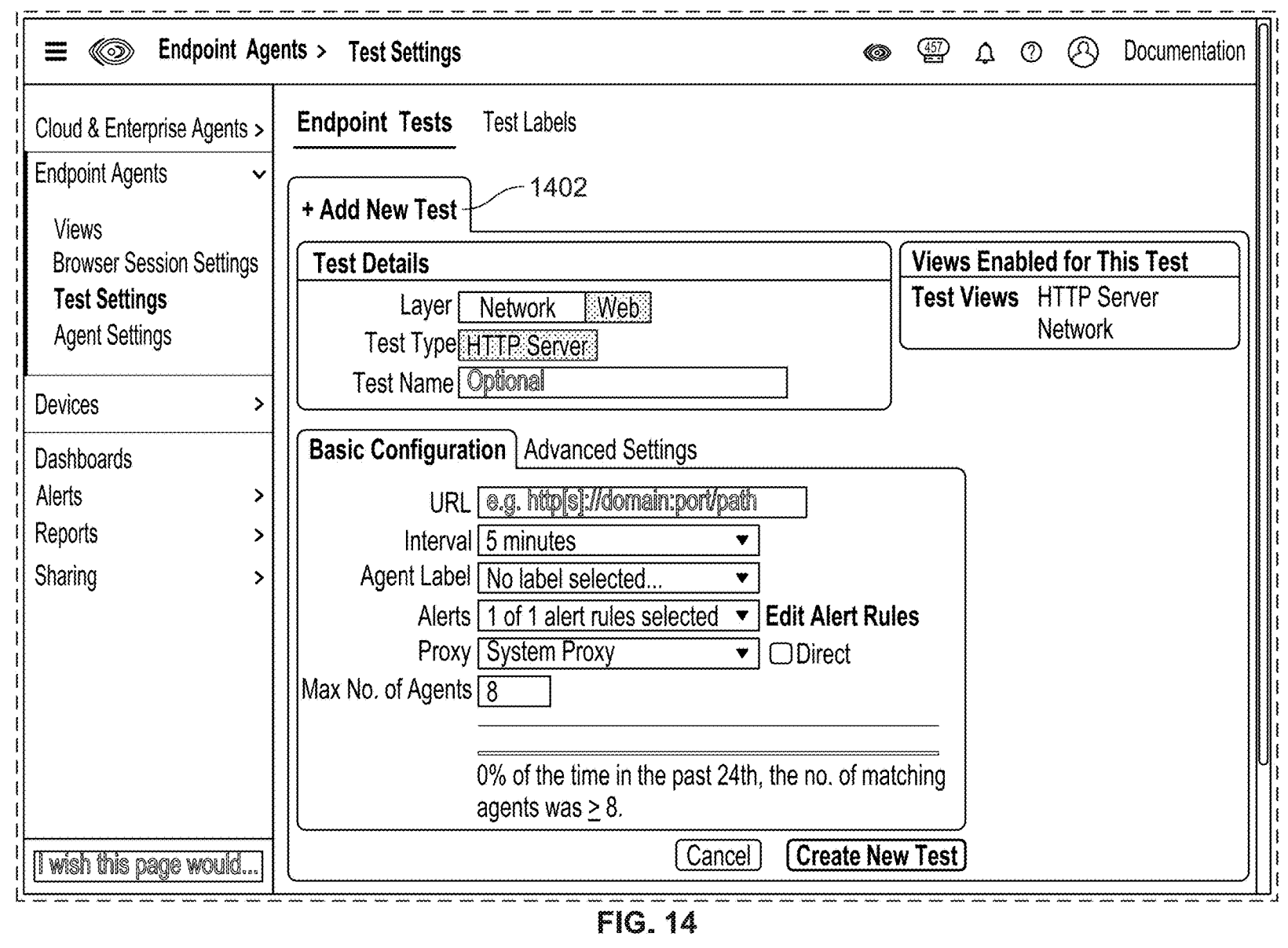

FIG. 14 is a screen diagram of dialog for creating a new test for dynamic assignment to endpoint agents in accordance with some embodiments. Referring to FIG. 14, a user can select the Add New Test button as shown at 1402 to start the process for creating a new test for dynamic assignment of scheduled tests to endpoint agents as further described below. In an example implementation, a user can create two types of tests: (1) an agent to server test (e.g., a network layer test), and (2) an HTTP server test (e.g., a web layer test).

Creating an Agent to Server (Network Layer) Test

FIG. 15 is a screen diagram of dialog for creating an agent to server (network layer) test for dynamic assignment to endpoint agents in accordance with some embodiments. Referring to FIG. 15, a user can select to create a Network Layer test (1) as shown at 1502 and, specifically, an Agent to Server test type (2) as shown at 1504.

In this example implementation of a Basic Configuration Tab for creating a new Agent to Server (Network Layer) test, the following configuration settings are available. As shown at 1506, a user can configure a Test Name (3). The Test Name is an optional parameter that gives the test a name. When no name is provided, then the value from the Target field will be used as a test name. As shown at 1508, a user can configure a Target (4). For example, the target can be configured with a Domain name or an IP address. As shown at 1510, a user can configure a Protocol (5). For example, the protocol can be configured with the Internet Control Message Protocol (ICMP). As shown at 1512, a user can configure an Interval (6) for performing the scheduled test (e.g., this value configures how frequently this test will be executed by the assigned endpoint agents). As shown at 1514, a user can configure an Agent Label (7). As similarly described above, endpoint tests are dynamically assigned to endpoint agents through labels. As shown at 1516, a user can configure a Max No. of Agents (8), which specifies the maximum of endpoint agents within the Agent Label to run the test from. A helper graph (9) as shown at 1518 indicates how many agents matching the label were available throughout the last 24 hours. Once a user is satisfied with their test configuration, a user can click on the Create New Test button (10) as shown at 1520 to complete the scheduled endpoint test creation process.

Creating an HTTP Server (Web Layer) Test

Figure 16:
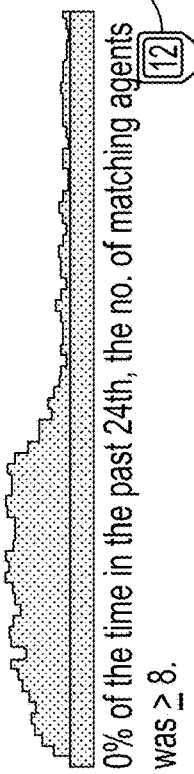
FIG. 16 is a screen diagram of dialog for creating an HTTP server (web layer) test for dynamic assignment to endpoint agents in accordance with some embodiments.

FIG. 16 is a screen diagram of dialog for creating an HTTP server (web layer) test for dynamic assignment to endpoint agents in accordance with some embodiments. Referring to FIG. 16, a user can select to create a Web Layer test (1) as shown at 1602 and, specifically, an HTTP Server test type (2) as shown at 1604.

In this example implementation of a Basic Configuration tab for creating a new HTTP Server (Web Layer) test, the following configuration settings are available. As shown at 1606, a user can configure a Test Name (3). The Test Name is an optional parameter that gives the test a name. When no name is provided, then the value in the URL field will be used as a test name, prepended with a protocol ("http://" by default). As shown at 1608, a user can configure a URL (4), such as a URL, domain name, or IP address, including the TCP port. If a domain name or IP address is used (i.e., protocol specification is not provided), then "http://" protocol is assumed. As shown at 1610, a user can configure an Interval (5) for performing the scheduled test (e.g., this value configures how frequently this test will be executed by the assigned endpoint agents). As shown at 1612, a user can configure an Agent Label (6). As similarly described above, endpoint tests are dynamically assigned to endpoint agents through labels. As shown at 1614, a user can configure Alerts (7) to select Alert Rules to assign to the test. As shown at 1616, a user can configure a Proxy (8) to select a Proxy configuration to assign to the test. The default of "System Proxy" uses the system's settings. As shown at 1618, a user can configure a Max No. of Agents (9), which specifies the maximum of endpoint agents within the Agent Label to run the test from. A helper graph (10) as shown at 1620 indicates how many agents matching the label were available throughout the last 24 hours. Once a user is satisfied with their test configuration, a user can click on the Create New Test button (12) as shown at 1624 to complete the scheduled endpoint test creation process.

Additionally, in the Advanced Settings tab (11) as shown at 1622, the following configuration settings are available. An HTTP Server Timing section is provided that includes a timeout for configuring the time period (e.g., number of seconds) until the test terminates due to an unresponsive target server, and a target time for view for configuring/setting the color legend on the global map, and the corresponding font colors for the Agent results table. For example, Response Time for an HTTP Server test sets the range of the legend from 0 seconds (e.g., green end) to two times the Target Time for View (e.g., red end). A Network section is provided that includes a data collection configuration for checking a box to collect network metrics and to perform path visualization. An HTTP Authentication section is provided that includes fields for configuring a username (e.g., the username for the account being accessed by the HTTP request(s)), a password (e.g., the password for the account being accessed by the HTTP request(s)), and a scheme (e.g., HTTP Basic Authentication or New Technology LAN Manager (NTLM)). An HTTP Request section is provided for configuring a Request Method to select the HTTP request method (e.g., either GET or POST, and if POST is selected, then the user may specify data in the POST Body field), an SSL Version for selecting the version of the SSL/TLS protocol to offer in the SSL/TLS Client Hello (e.g., this setting will set the maximum version of SSL/TLS that the connection can use, but a lower version may be negotiated by the server), a Verify SSL certificate (e.g., by default, certificate-related errors will result in a test error, and users can uncheck this box to ignore certificate errors during SSL/TLS negotiation), a Customer Headers for entering one or more HTTP header strings (e.g., in the form "<stringname>: <value>" (without quotes)), and an Override DNS that instead of using standard DNS resolution, allows a user to specify the IP address to which the target's domain name will resolve (e.g., this setting can be useful for targeting a specific server within a cluster, or when testing HTTPS URLs that require a Server Name Indication (SNI) in the SSL/TLS negotiation that is different from the domain name-to-IP address mapping required to access the URL). An HTTP Response section is also provided that allows a user to configure a Desired Status Code (e.g., for setting the HTTP status code returned by the server that is defined as a successful test (i.e., no errors will be displayed in the test table results, no response code-based alerts generated etc.)), a Verify Content (e.g., for searching the HTTP headers and body for text that matches the expression in the Verify Content field), and a Limit Download Size (e.g., for loading only the first number of kilobytes (kB) specified in the field below the Enable box).

Endpoint Agent Views—Scheduled Tests

In some embodiments, endpoint agents can execute various types of scheduled tests at regular intervals. In an example implementation, the types of scheduled tests include a network layer's agent to server test type and a web layer's HTTP Server test type as described above. In this section, views of the scheduled tests will now be described.

Figure 17:
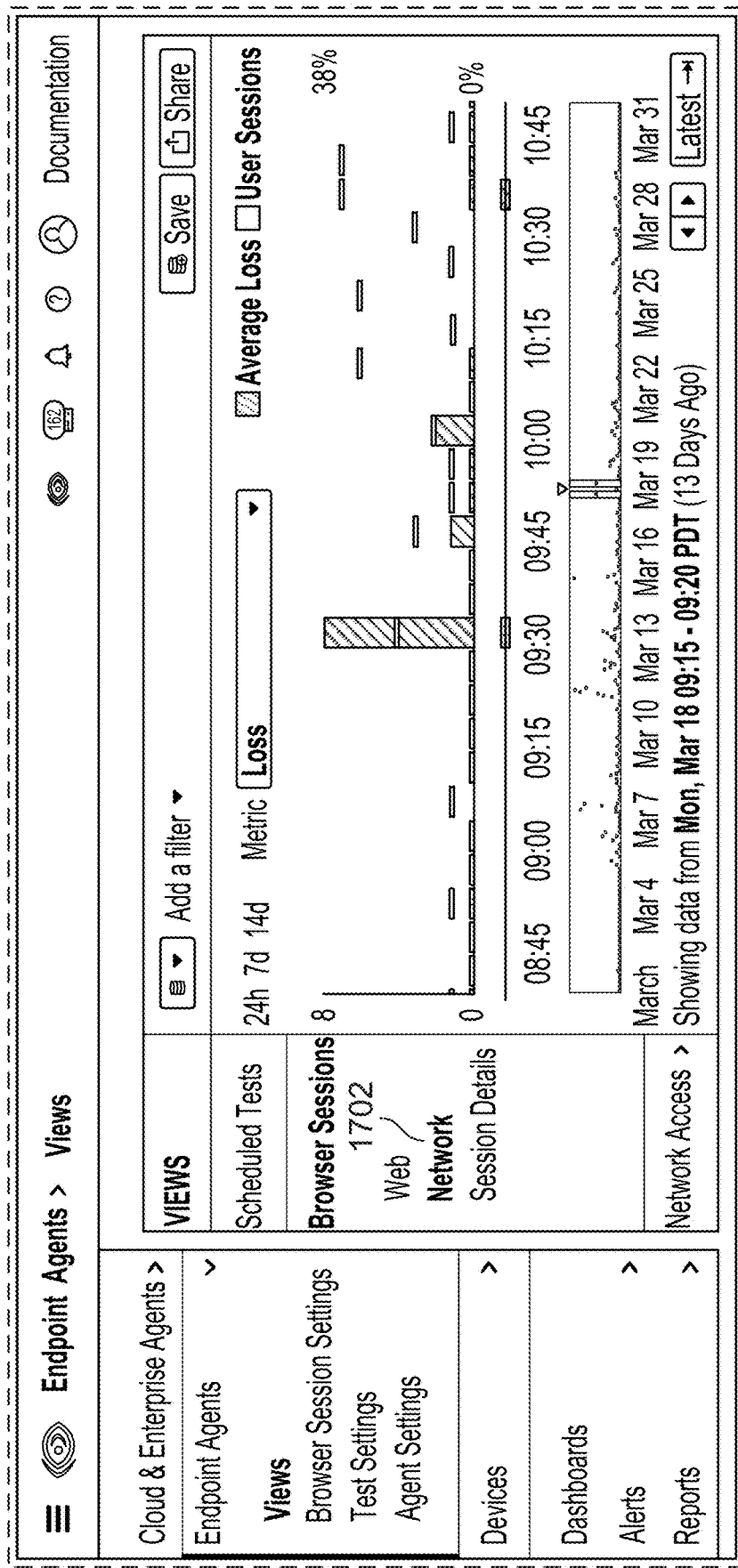
FIG. 17 illustrates a screen diagram of endpoint agent views for scheduled tests in accordance with some embodiments.

FIG. 17 illustrates a screen diagram of endpoint agent views for scheduled tests in accordance with some embodiments. This example screen diagram is an endpoint agent view of results for a network test as shown at 1702.

Figure 18:
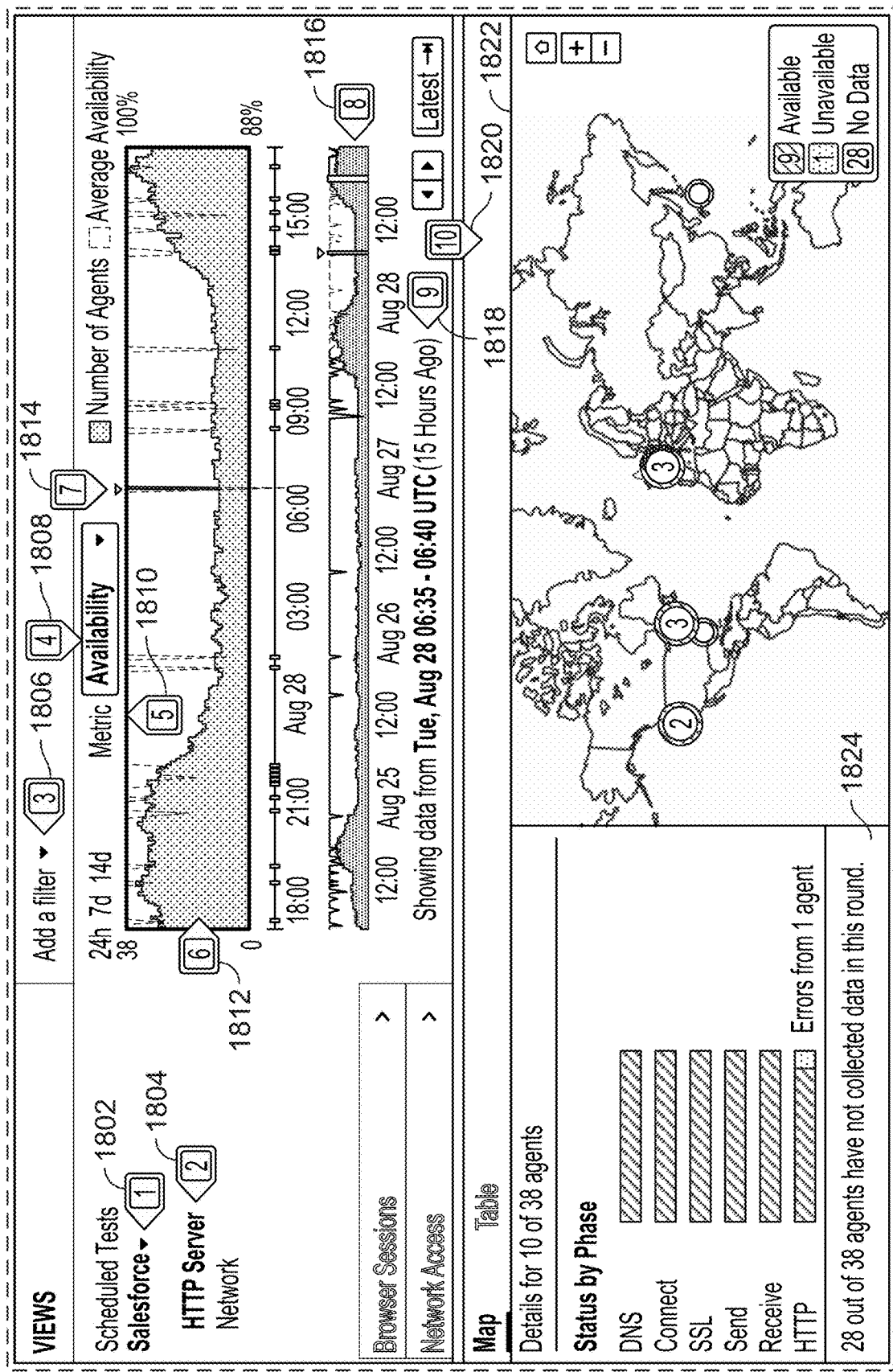
FIG. 18 illustrates a screen diagram of an endpoint scheduled test results view with an HTTP server test selected in accordance with some embodiments.

FIG. 18 illustrates a screen diagram of an endpoint scheduled test results view with an HTTP server test selected in accordance with some embodiments. As shown in FIG. 18, the endpoint agent scheduled test results view (e.g., in this example view, an HTTP Server test results view) includes various components that will now be described. As shown at 1802, a test selector component (1) is provided for selecting the test to display in the view. As shown at 1804, a layer selector component (2) is provided for selecting the layer to display. In this example, the HTTP Server tests have a Network layer available when a Perform network measurements setting is enabled in the test's Advanced Settings tab. As shown at 1806, a data filters component (3) is provided for filtering the displayed data (e.g., the data displayed in the time slide (5, 6) as shown at 1810 and 1812 and data view (10) as shown at 1820 is affected by this filtering component). As shown at 1808, a metric selector component (4) is provided for selecting the metric to be displayed on the time slide (5) as shown at 1810. As shown at 1810, a colored line (5) on the timeline provides a time series visualization of the selected metric. As shown at 1812, a grey area (6) on the timeline provides a time series of the number of endpoint agents that provide test results data. As shown at 1814, a time interval selector component (7) provides the data from the selected time interval, which is displayed in the data view (10) as shown at 1820. As shown at 1816, a time range selector component (8) provides a colored section that defines the displayed data (5, 6) as shown at 1810 and 1812 and the data view (10) as shown at 1820 (e.g., in this example, the remaining data is shown in grey). As shown at 1818, a selected time component (9) is provided for a user to choose a selected time interval for the test results data to be displayed in this test results view. As shown at 1820, a data view pane for the selected time interval component (10) is provided for displaying data submitted by the endpoint agents that match the configured filters (3) as shown at 1806 in the selected time interval (7, 9) as shown at 1814 and 1818.

In this example, the HTTP Server test view collects the following metrics: availability (e.g., a percentage of time that the site is available, aggregated across all displayed agents), response time (e.g., also referred to as time-to-first-byte, this is the time elapsed from the beginning of the request (before DNS request) until the client receives the first byte of the response from the server), and throughput (e.g., this metric is calculated by dividing the total wire size by the received time and expressed in MB/s).

Referring to FIG. 18, the bottom pane on the HTTP Server view is split into two tabs. A map view 1822 shows the geolocation of the agents in a map and a breakdown of the connection status by different phases. An informational message 1824 below the status bars shows the number of agents that collected data out of the total checked-in agents for the selected test time interval. A table view provides a breakdown of the selected metrics collected per agent for the selected time interval.

Figure 19:
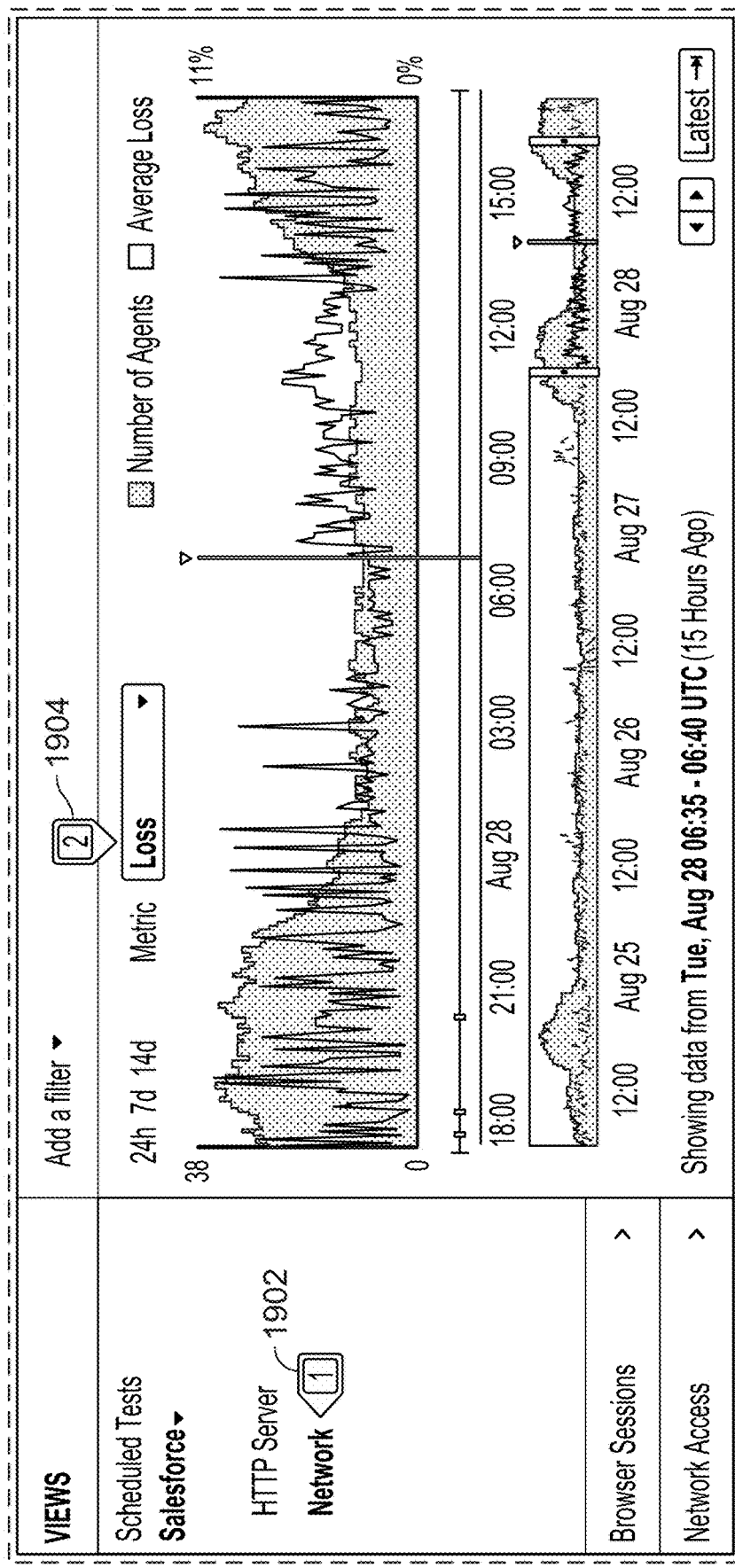
FIG. 19 illustrates a screen diagram of an endpoint scheduled test results view with a network test selected in accordance with some embodiments.

FIG. 19 illustrates a screen diagram of an endpoint scheduled test results view with a network test selected in accordance with some embodiments. As shown in FIG. 19, a network test results view timeline is provided for a selected Network (1) tests view as shown at 1902. A user can select a metric (2) as shown at 1904 to view various collected metrics (e.g., loss, latency, and jitter) as described below.

In this example, the network (Agent to Server) test on an endpoint agent measures the following metrics: end-to-end packet loss (e.g., the percentage of packets lost is calculated by subtracting the number of reply packets the agent receives from the target (responses) from the number of packets sent by the agent, then dividing by the number of packets sent, then multiplying by 100), latency (e.g., the average of the round-trip packet time, in which the round-trip packet time is the time from which a packet is sent by the agent to the time the agent receives a reply), and jitter (e.g., the standard deviation of latency, in which the standard deviation indicates how widely spread the measurements are around the average, such that a larger standard deviation indicates a wider spread of the measurements).

Figure 20:
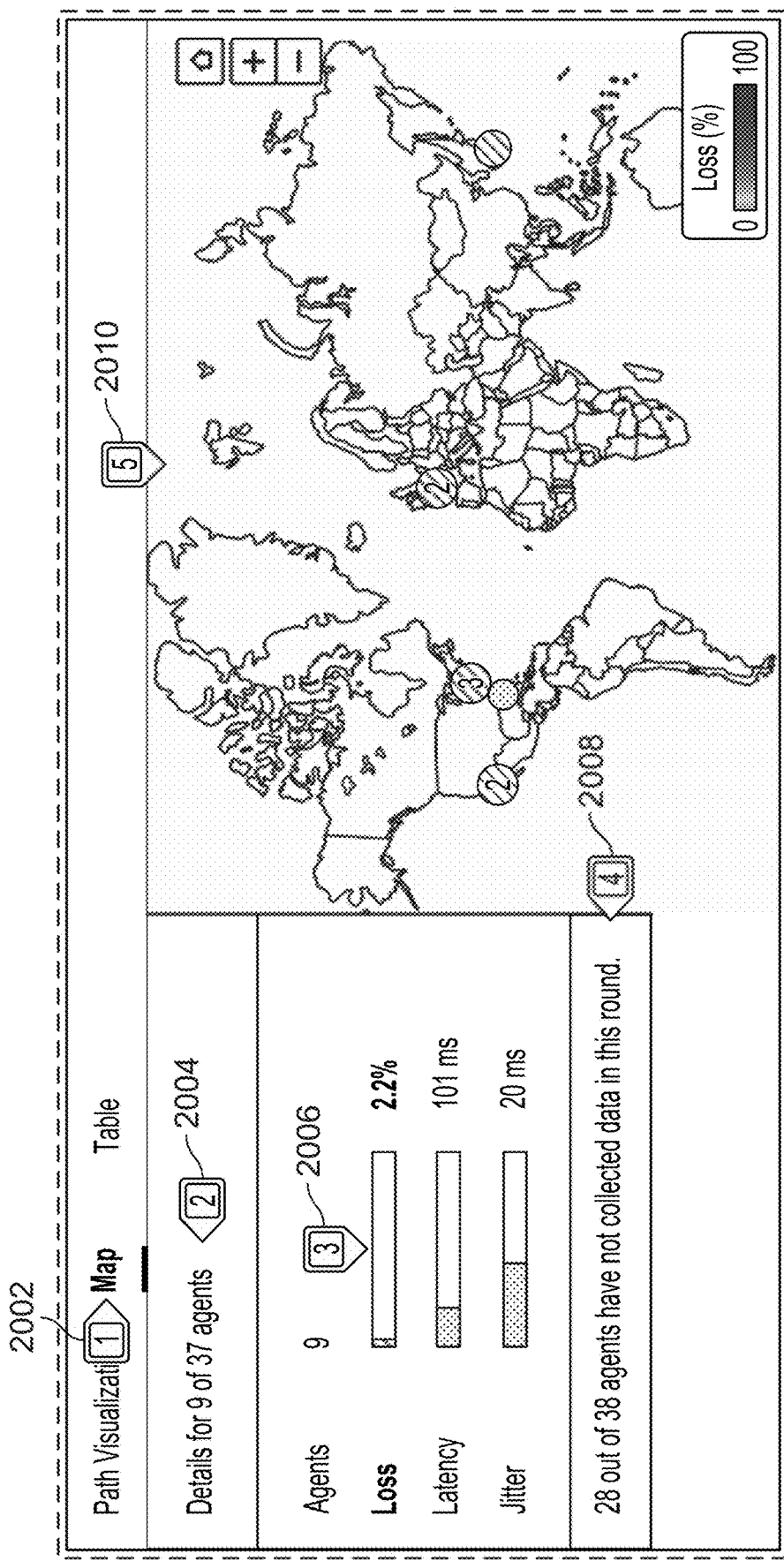
FIG. 20 illustrates a screen diagram of a map view for network tests in accordance with some embodiments.

FIG. 20 illustrates a screen diagram of a map view for network tests in accordance with some embodiments. As shown in FIG. 20, a map tab (1) as shown at 2002 of the network test view is provided that includes details for 9 of 37 agents as shown at 2004 (e.g., this shows the number of agents that collected data out of the total checked-in agents for the selected test time interval). The selected metric, in this example, loss (3) is shown at 2006. As indicated in the informational message (4) as shown at 2008 below the status bars, in this example, 28 out of 37 agents have not collected data in this round. A map view (5) as shown at 2010 shows the geographical location and status of the reporting agents for the selected metric, in this case, loss metric.

In this example, the available metrics can be selected for display in the Metrics drop-down menu. Additionally, metrics are also represented and clickable on the left side of the Map tab content.

Figure 21:
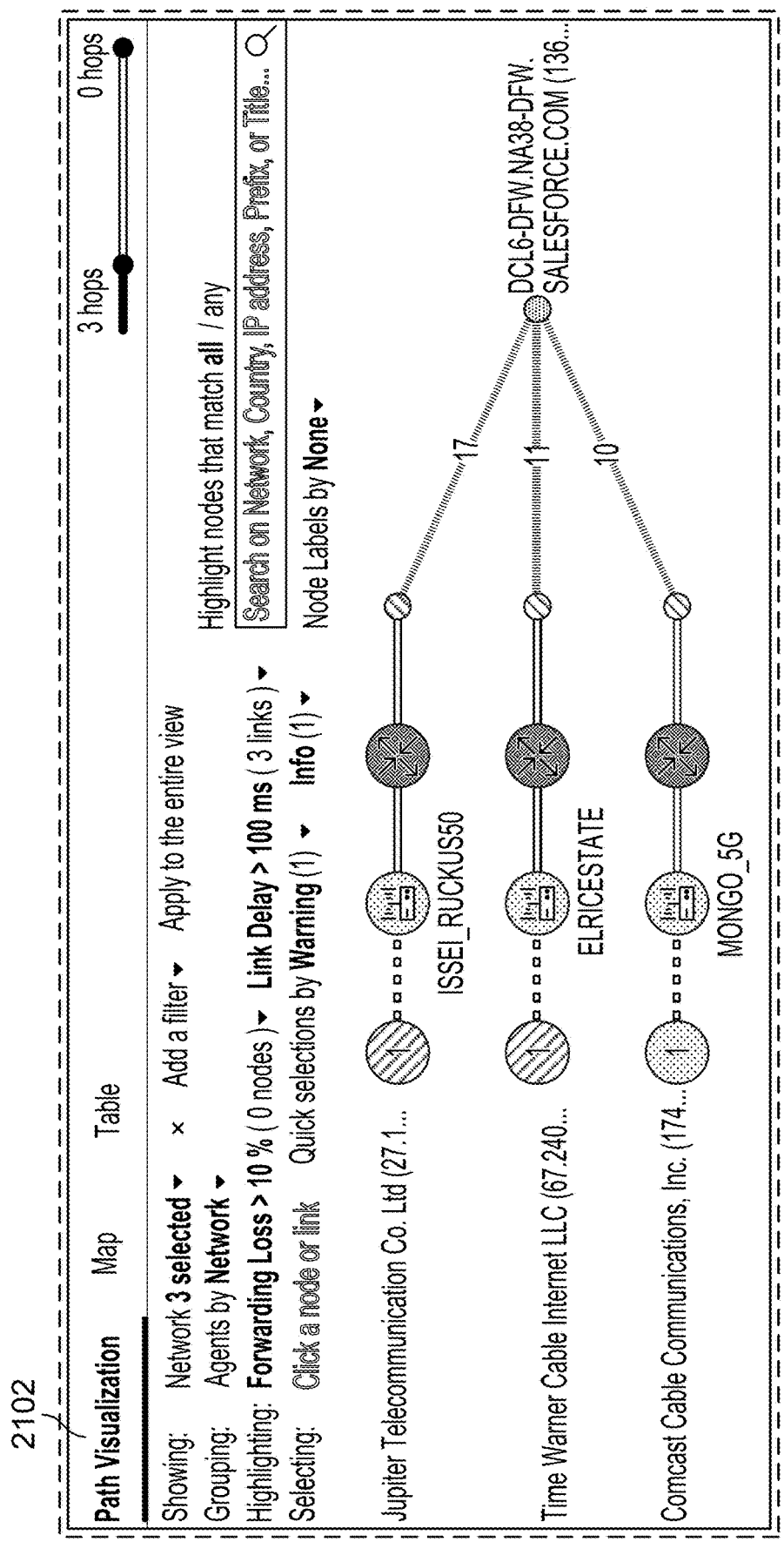
FIG. 21 illustrates a screen diagram of a network path visualization view for network tests in accordance with some embodiments.

FIG. 21 illustrates a screen diagram of a network path visualization view for network tests in accordance with some embodiments. As shown in FIG. 21, a path visualization tab 2102 is selected to provide a network path visualization for network tests.

In this example implementation, the bottom pane on the Network view includes three tabs. A Path Visualization tab shows a network layer-3 (L3) hop-by-hop topology view from the source endpoint agent to the test target, such as shown in FIG. 21. A Map view shows the geolocation of the agents in a map view and the collected metrics, such as shown in FIG. 20. A Table view provides a breakdown of the metrics collected per agent for the selected time interval.

Figure 22:
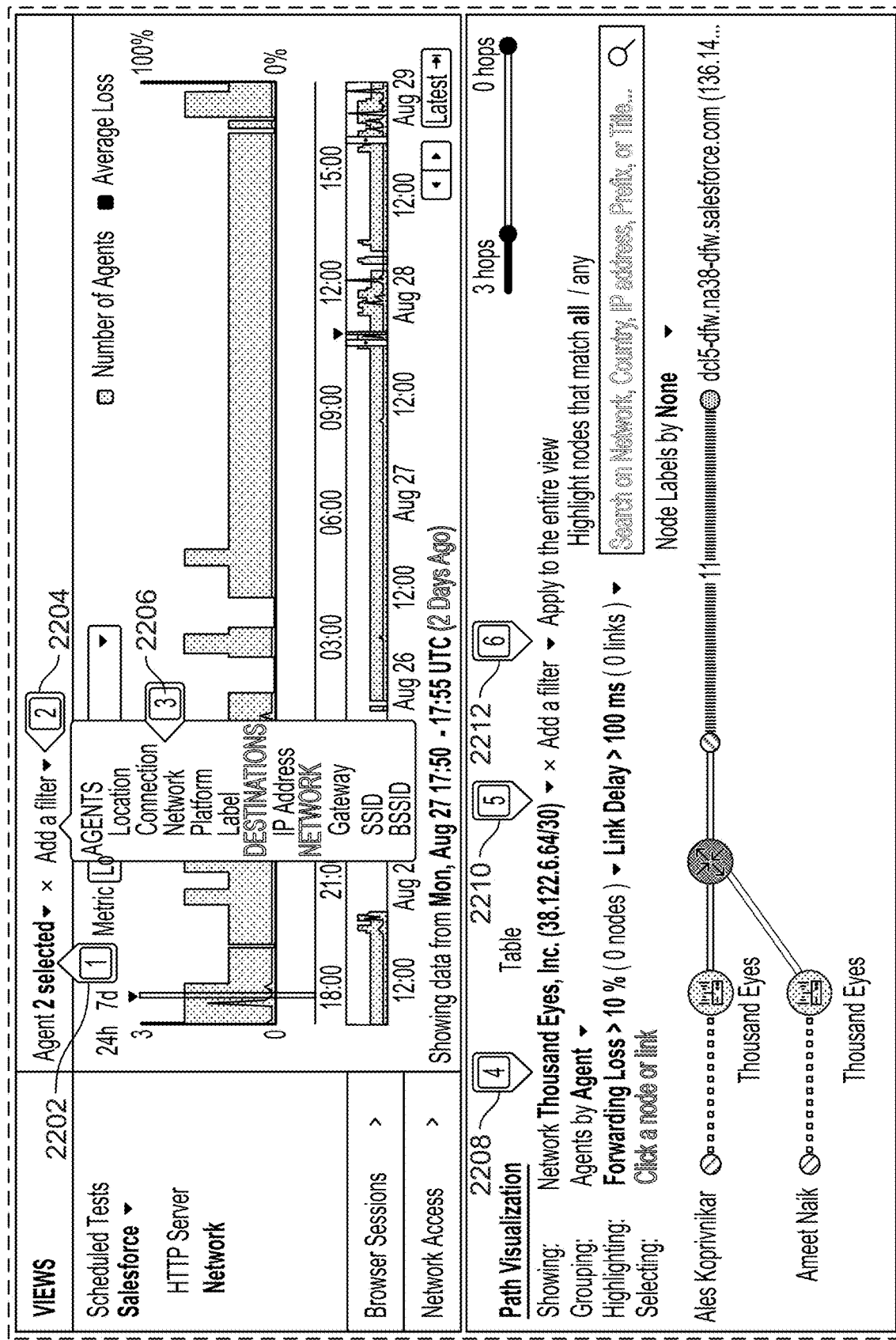
FIG. 22 illustrates a screen diagram of data filtering in the network path visualization view for network tests in accordance with some embodiments.

FIG. 22 illustrates a screen diagram of data filtering in the network path visualization view for network tests in accordance with some embodiments. In one embodiment, endpoint agent views provide extensive data filtering capabilities that enable users to drill down the data and present it in the most useful manner. In the following figure, the filtering controls are indicated.

Example filtering controls will now be described as shown in FIG. 22. As shown at 2202, configured filters (1) shows currently configured filters. Clicking the X icon removes the corresponding filter. A new filter dialogue (2) as shown at 2204 applies a new filter to the data shown. One or more filters can be configured. Filters are combined using the logical operator "AND." Available filters (3) as shown at 2206 includes a list of available filters. Path Visualization-specific configured filters (4) as shown at 2208 shows currently configured filters ((3) as shown at 2206 path visualization only). Clicking the X icon removes the corresponding filter. Path Visualization-specific new filter dialogue (5) as shown at 2210 applies a new filter to the data shown ((3) as shown at 2206 path visualization only). One or more filters can be configured. Filters are combined using the logical operator "AND." Apply to the entire view (6) as shown at 2212 is a component that a user can utilize such that if a filter set configured specifically for the path visualization seems useful, clicking this link will apply the same filter to the entire view (e.g., the filters will be copied into the configured filters section at the top of the view).

Example processes for monitoring enterprise networks (e.g., enterprise IT networks) with scheduled tests for endpoint agents using the disclosed techniques will now be described below.

Figure 23:
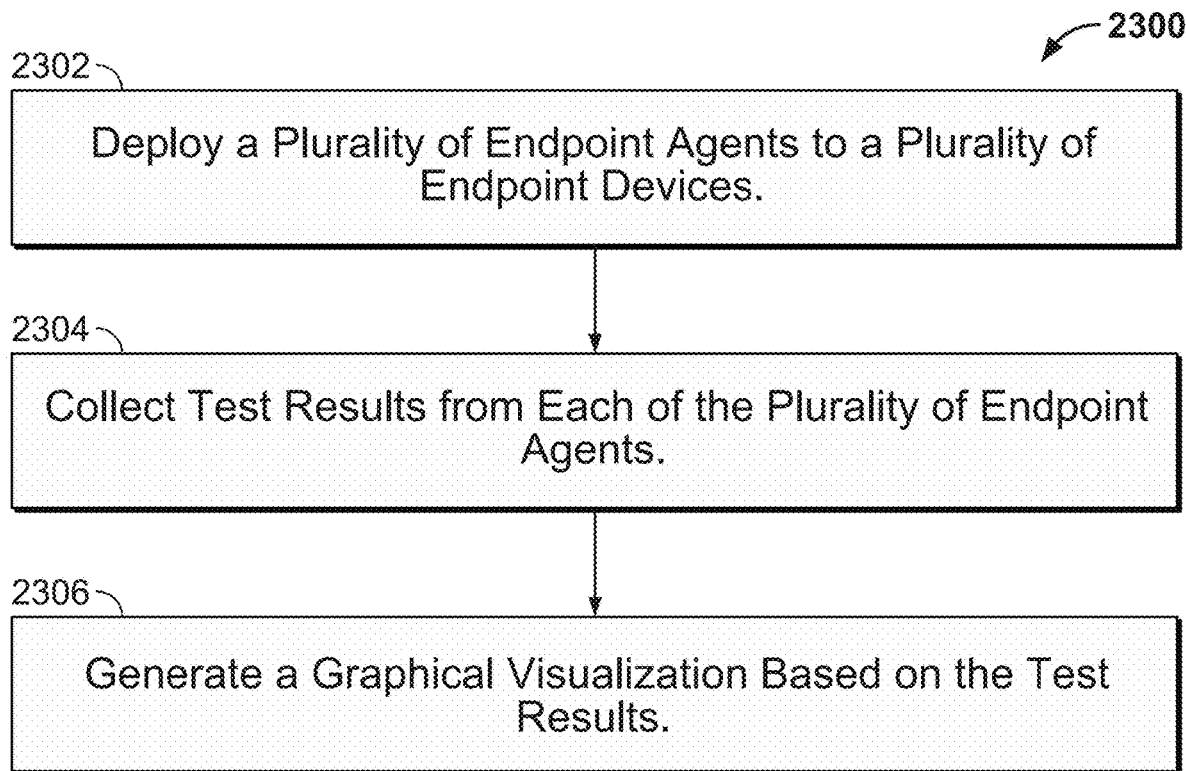
FIG. 23 illustrates a flow diagram for monitoring enterprise networks with endpoint agents in accordance with some embodiments.

Processes for Monitoring Enterprise Networks with Scheduled Tests for Endpoint Agents FIG. 23 illustrates a flow diagram for monitoring enterprise networks with endpoint agents in accordance with some embodiments. In some embodiments, process 2300 is performed using platform 100 as shown in FIG. 23.

At 2302, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

In one embodiment, each of the plurality of endpoint agents performs network monitoring tests and system monitoring tests. For example, the endpoint agents can perform network monitoring tests and system monitoring tests (e.g., including process monitoring) as similarly described above.

In one embodiment, each of the plurality of endpoint agents is controlled by an agent controller. For example, the agent controller can facilitate deployment, configuration, and data collection operations with each of the plurality of endpoint agents.

In one embodiment, the tests that can be performed by the endpoint agents on the endpoint devices are configurable. For example, the tests can be configured to be performed based on a schedule, periodically, on demand, and/or based on a trigger as similarly described above. As another example, the test can be configured to be performed based on labels associated with the endpoint agents as similarly described above.

At 2304, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 2306, generating a graphic visualization based on the test results is performed. For example, a graphical visualization of an application delivery state for one or more application delivery layers based on the test results can be generated and output using the disclosed platform (e.g., generated by a web tier of the platform described above).

In one embodiment, the graphical visualization of the application delivery state facilitates troubleshooting of network performance problems associated with one or more of the plurality of endpoint devices. Example graphical visualizations that can be generated include the GUI visualizations similarly described above (e.g., including node grouping, node pagination, and network infrastructure visualizations as similarly described above).

Figure 24:
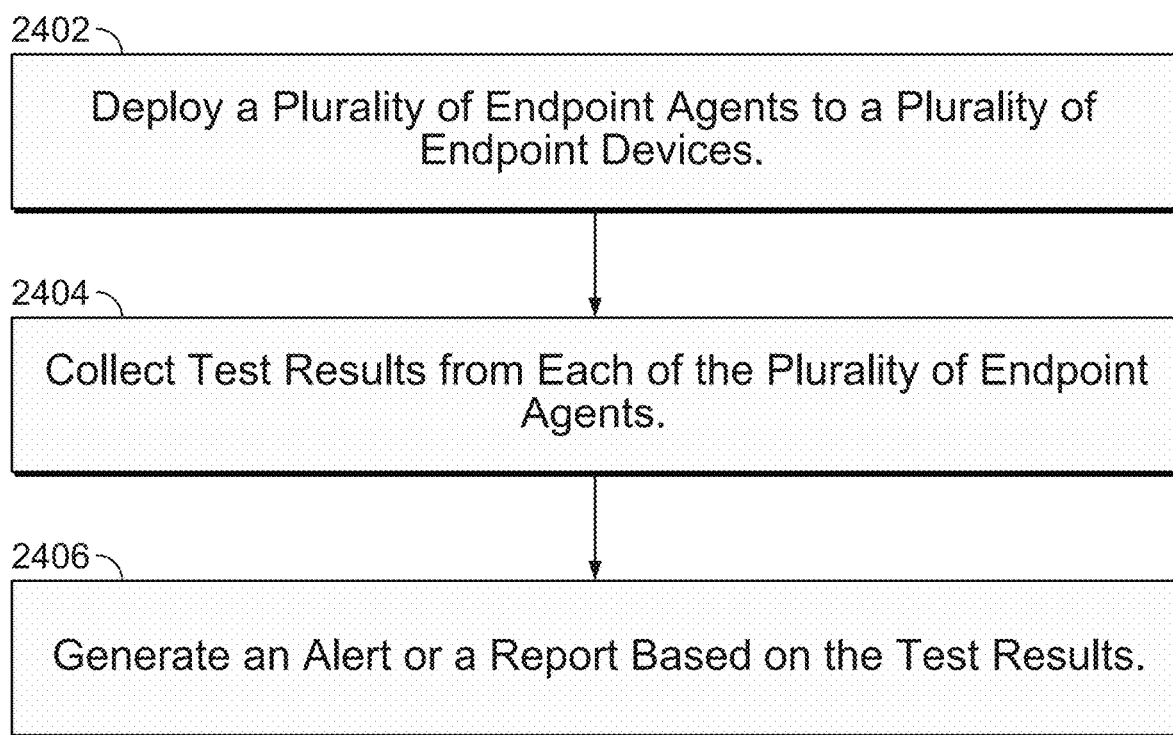
FIG. 24 illustrates a flow diagram for monitoring enterprise networks with endpoint agents in accordance with some embodiments.

FIG. 24 illustrates another flow diagram for monitoring enterprise networks with endpoint agents in accordance with some embodiments. In some embodiments, process 2400 is performed using platform 100 as shown in FIG. 24.

At 2402, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

At 2404, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 2406, generating an alert or a report based on the test results is performed. For example, an alert based on the test results can be generated and output (e.g., a GUI alert, an email/text/phone call alert, and/or other alert notification can be provided based on a configuration for alert notifications and/or based on the alert). As another example, a report can be generated that includes aggregated test data results, such as over a period of time (e.g., 30 days, 90 days, and/or some other configurable period of time). As yet another example, the alert or report can include an event that is determined based on the test results (e.g., events can be based on results from one endpoint agent and/or based on results from two or more endpoint agents (collective intelligence based on endpoint agent data collection, which can also include test results from other agents executed on network infrastructure elements/devices, destination sites, and/or cloud agents)). Example events that can be detected using the disclosed techniques can include detection of traffic outages, network infrastructure outages, application outages, and Internet Intelligence.

Figure 25:
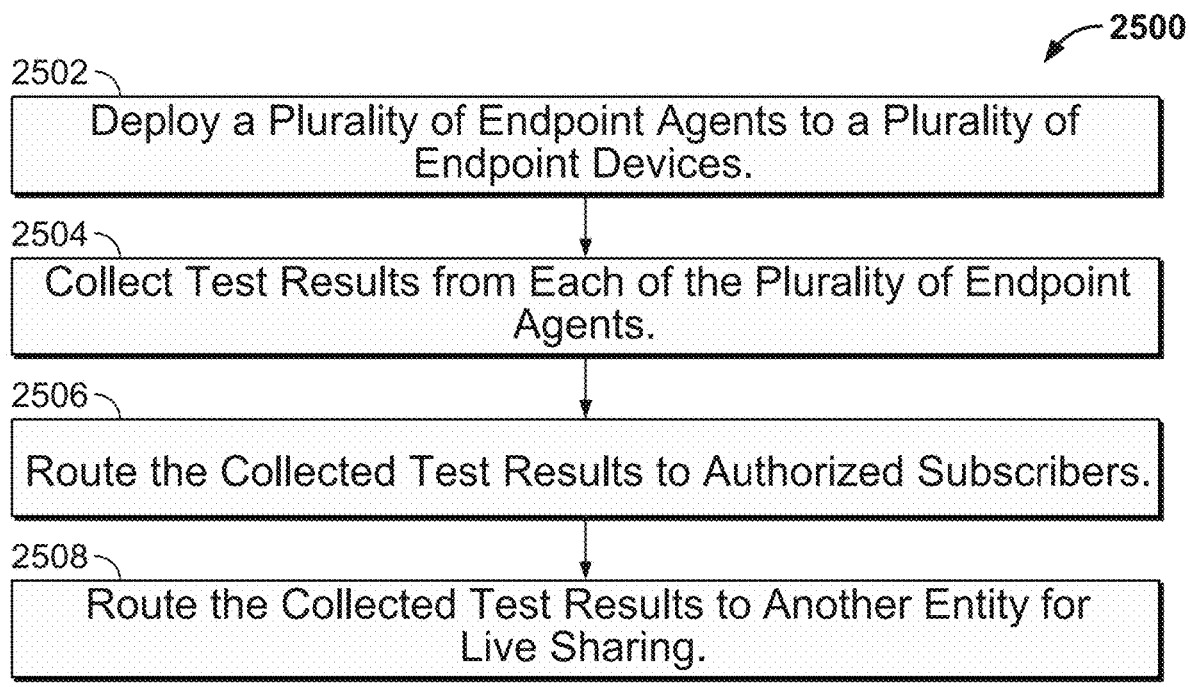
FIG. 25 illustrates a flow diagram for monitoring enterprise networks with endpoint agents in accordance with some embodiments.

FIG. 25 illustrates another flow diagram for monitoring enterprise networks with endpoint agents in accordance with some embodiments. In some embodiments, process 2500 is performed using platform 100 as shown in FIG. 25.

At 2502, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

At 2504, collecting test results from each of the plurality of endpoint agents is performed, wherein the test results are based on tests executed on each of the plurality of endpoint devices for monitoring network activity. For example, test results from each of the plurality of endpoint agents can be collected using the platform described above. As similarly described above, endpoint agents can provide user experience monitoring to facilitate diagnosis and troubleshooting of network performance and/or endpoint device system performance problems.

At 2506, routing the collected test results to authorized subscribers is performed. For example, the routing of collected test results to authorized subscribers can be performed as similarly described above (e.g., as similarly described above in the section entitled, Data Routing Workflow for Data Collected from Endpoint Agents).

At 2508, routing the collected test results to another entity for live sharing is performed. For example, the routing of collected test results to another entity for live sharing can be performed as similarly described above (e.g., as similarly described above in the section entitled, Data Routing Workflow for Live Sharing for Data Collected from Endpoint Agents). For example, such live sharing techniques for sharing the collected data can facilitate troubleshooting information to be shared by ACME Corporation with their Software as a Service (SaaS) provider (e.g., Microsoft for Office365 or another service/provider).

Figure 26:
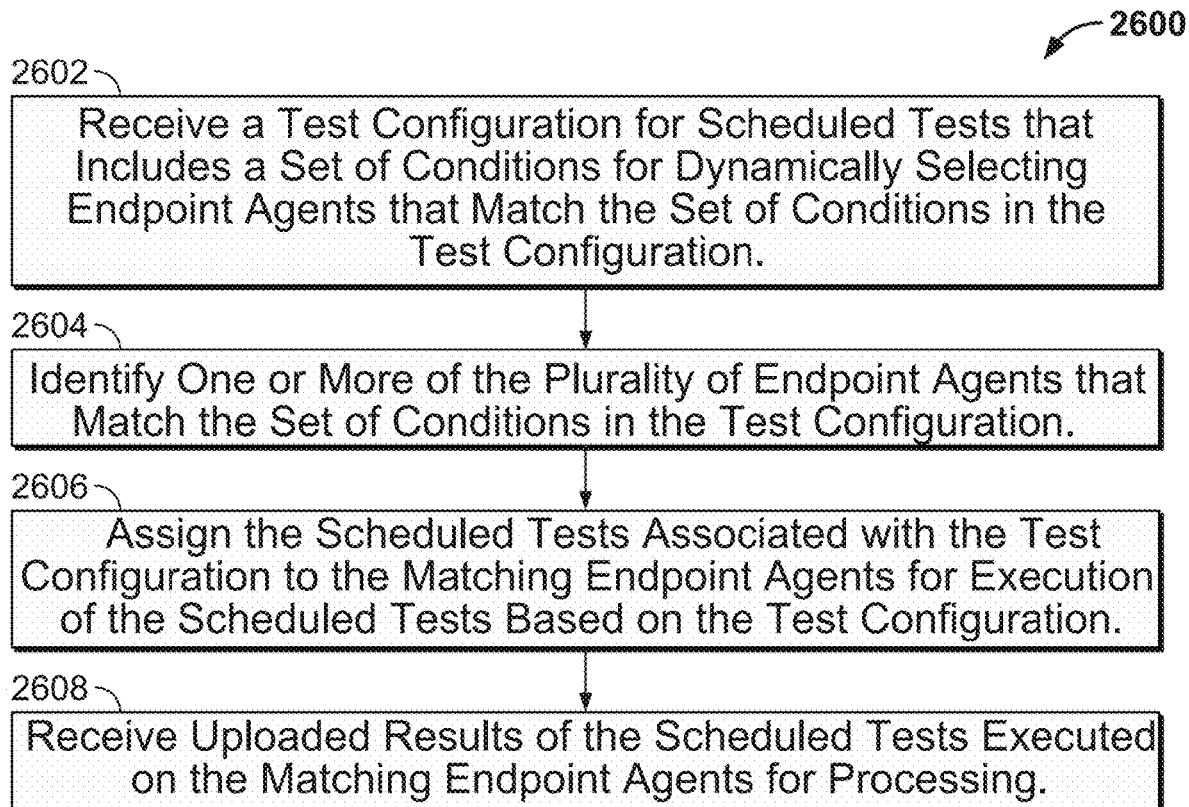
FIG. 26 illustrates a flow diagram for monitoring enterprise networks with scheduled tests for endpoint agents in accordance with some embodiments.

FIG. 26 illustrates a flow diagram for monitoring enterprise networks with scheduled tests for endpoint agents in accordance with some embodiments. In some embodiments, process 2600 is performed using platform 100 as shown in FIG. 26.

At 2602, a test configuration for scheduled tests that includes a set of conditions for dynamically selecting endpoint agents that match the set of conditions in the test configuration is received. For example, a plurality of endpoint agents are deployed to a plurality of endpoint devices, and the endpoint agents can be selected for execution of one or more scheduled tests based on the set of conditions as similarly described above.

At 2604, identifying one or more of the plurality of endpoint agents that match the set of conditions in the test configuration is performed. For example, the endpoint agents can be selected based on the labels as similarly described above.

At 2606, assigning the scheduled tests associated with the test configuration to the matching endpoint agents for execution of the scheduled tests based on the test configuration is performed. For example, the test results are based on the scheduled tests executed on each of the matching endpoint agents for monitoring network activity as similarly described above.

At 2608, uploaded results of the scheduled tests executed on the matching endpoint agents are received for processing. For example, the uploaded results of the scheduled tests executed on the matching endpoint agents are processed for generating graphical visualizations and/or alerts of the monitored network activity as similarly described above.

Figure 27:
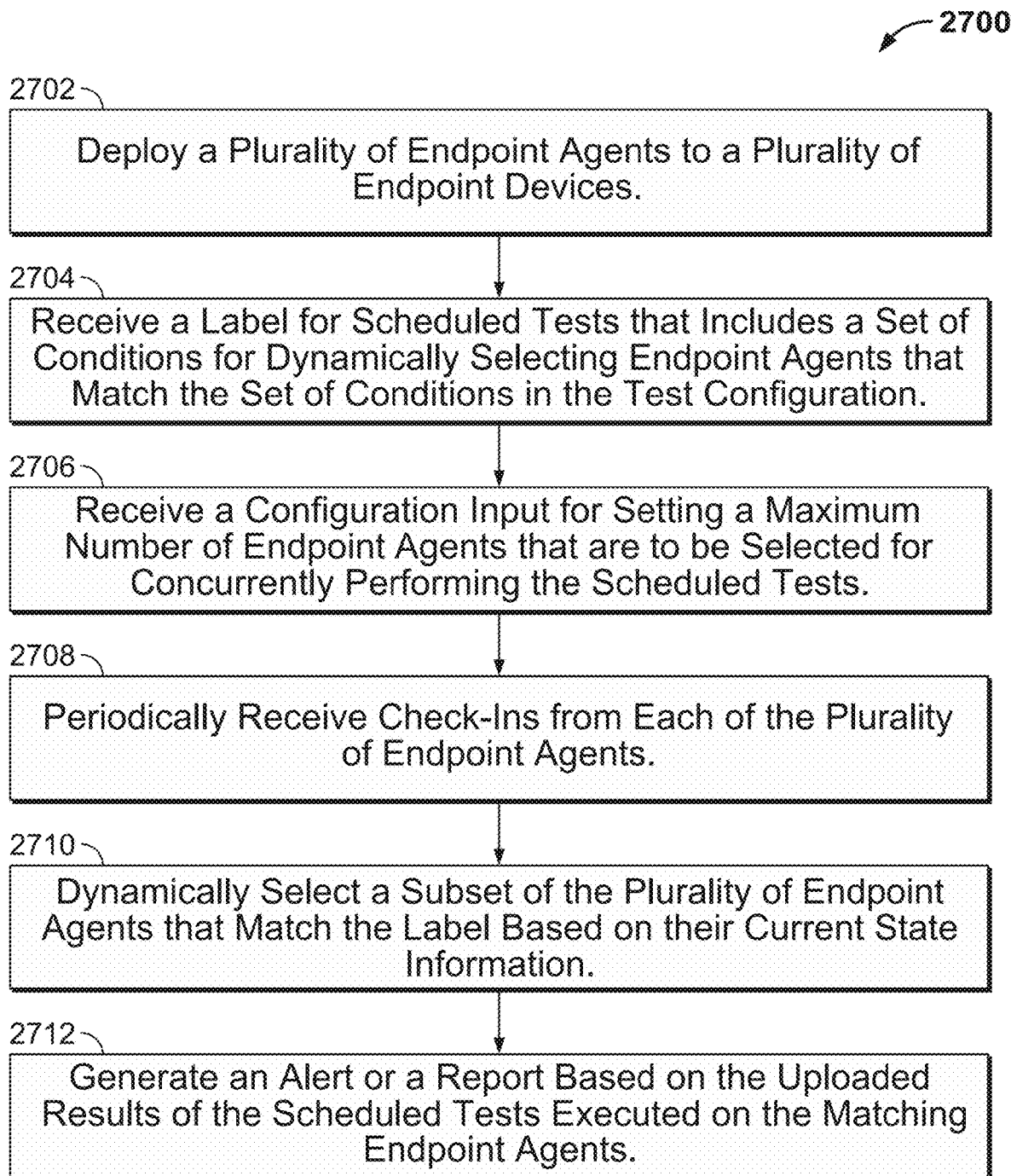
FIG. 27 illustrates another flow diagram for monitoring enterprise networks with scheduled tests for endpoint agents in accordance with some embodiments.

FIG. 27 illustrates another flow diagram for monitoring enterprise networks with scheduled tests for endpoint agents in accordance with some embodiments. In some embodiments, process 2700 is performed using platform 100 as shown in FIG. 27.

At 2702, deploying a plurality of endpoint agents to a plurality of endpoint devices is performed. For example, a plurality of endpoint agents can be distributed to a plurality of endpoint devices using the platform described above. As similarly described above, an endpoint agent can be implemented using the endpoint architecture described above to perform the disclosed techniques for monitoring enterprise networks using endpoint agents.

At 2704, a label for scheduled tests that includes a set of conditions for dynamically selecting endpoint agents that match the set of conditions in the test configuration is received. For example, a plurality of endpoint agents are deployed to a plurality of endpoint devices, and the endpoint agents can be selected for execution of one or more scheduled tests based on the set of conditions as similarly described above. The test configuration can also include a test type (e.g., a network layer test, a web layer test, etc.), a target (e.g., a server, website, etc.), and an interval (e.g., every 1 minute, 5 minutes, or some other time interval) for executing the scheduled tests as similarly described above.

At 2706, a configuration input for setting a maximum number of endpoint agents that are to be selected for concurrently performing the scheduled tests is received.

At 2708, check-ins from each of the plurality of endpoint agents are periodically received. For example, the agents can check in to provide current state information as similarly described above.

At 2710, a subset of the plurality of endpoint agents that match the label based on their current state information is dynamically selected. The subset of the plurality of endpoint agents does not exceed the maximum number of endpoint agents that are to be selected for performing the scheduled tests. The selected endpoint agents will then receive the scheduled tests and execute the scheduled tests based on a configured interval as similarly described above.

At 2712, generating an alert or a report based on the uploaded results of the scheduled tests executed on the matching endpoint agents is performed. For example, an alert based on the test results can be generated and output (e.g., a GUI alert, an email/text/phone call alert, and/or other alert notification can be provided based on a configuration for alert notifications and/or based on the alert). As another example, a report can be generated that includes aggregated test data results, such as over a period of time (e.g., 30 days, 90 days, and/or some other configurable period of time). As yet another example, the alert or report can include an event that is determined based on the test results (e.g., events can be based on results from one endpoint agent and/or based on results from two or more endpoint agents (collective intelligence based on endpoint agent data collection, which can also include test results from other agents executed on network infrastructure elements/devices, destination sites, and/or cloud agents)). Example events that can be detected using the disclosed techniques can include detection of traffic outages, network infrastructure outages, application outages, and Internet Intelligence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive a test configuration for scheduled tests that includes a label for a set of conditions for dynamically selecting endpoint agents that match the set of conditions in the test configuration, wherein a plurality of endpoint agents are deployed to a plurality of endpoint devices;
    receive a configuration input for setting a maximum number of endpoint agents that are to be selected for concurrently performing the scheduled tests;
    identify one or more of the plurality of endpoint agents that match the label for the set of conditions in the test configuration, wherein each of the plurality of endpoint agents that match the label for the set of conditions in the test configuration is dynamically associated with the label based on a current network, a geography, an operating system (OS), a set of current state information, and/or other runtime/state information;
    assign the scheduled tests associated with the test configuration to the matching endpoint agents for execution of the scheduled tests based on the test configuration, wherein a number of the matching endpoint agents that are assigned the scheduled tests does not exceed the maximum number of endpoint agents that are to be selected for concurrently performing the scheduled tests, and wherein test results are based on the scheduled tests executed on each of the matching endpoint agents for monitoring network activity; and
    receive uploaded results of the scheduled tests executed on the matching endpoint agents, wherein the uploaded results of the scheduled tests executed on the matching endpoint agents are processed for generating graphical visualizations and/or alerts of the monitored network activity; and
  a memory coupled to the processor and configured to provide the processor with instructions.

2. The system recited in claim 1, wherein graphical visualizations of an application delivery state facilitate troubleshooting of network performance problems associated with one or more of the plurality of endpoint devices.

3. The system recited in claim 1, wherein each of the plurality of endpoint agents performs network monitoring tests and system monitoring tests.

4. The system recited in claim 1, wherein each of the plurality of endpoint agents is controlled by an agent controller.

5. The system recited in claim 1, wherein the graphical visualizations are generated by a web tier.

6. The system recited in claim 1, wherein the scheduled tests that can be performed by the endpoint agents on the endpoint devices are configurable.

7. The system recited in claim 1, wherein the processor is further configured to:
  receive state information periodically from each of the plurality of endpoint agents.

8. The system recited in claim 1, wherein the processor is further configured to:
  deploy a plurality of endpoint agents to a plurality of endpoint devices.

9. The system recited in claim 1, wherein the processor is further configured to:
  deploy a plurality of endpoint agents to a plurality of endpoint devices; and
  collect test results from each of the plurality of endpoint agents for a plurality of tests, wherein the test results are based on tests executed on each of the plurality of endpoint devices for monitoring network activity.

10. The system recited in claim 1, wherein the processor is further configured to:
  deploy a plurality of endpoint agents to a plurality of endpoint devices;
  collect test results from each of the plurality of endpoint agents for a plurality of tests, wherein the test results are based on tests executed on each of the plurality of endpoint devices for monitoring network activity; and
  generate a graphical visualization of an application delivery state for one or more application delivery layers based on the test results.

11. The system recited in claim 1, wherein the processor is further configured to:
  receive another configuration input for setting a maximum number of tests assigned for a single endpoint agent.

12. A method, comprising:
  receiving a test configuration for scheduled tests that includes a label for a set of conditions for dynamically selecting endpoint agents that match the set of conditions in the test configuration, wherein a plurality of endpoint agents are deployed to a plurality of endpoint devices;

receiving a configuration input for setting a maximum number of endpoint agents that are to be selected for concurrently performing the scheduled tests;

identifying one or more of the plurality of endpoint agents that match the label for the set of conditions in the test configuration, wherein each of the plurality of endpoint agents that match the label for the set of conditions in the test configuration is dynamically associated with the label based on a current network, a geography, an operating system (OS), a set of current state information, and/or other runtime/state information;

assigning the scheduled tests associated with the test configuration to the matching endpoint agents for execution of the scheduled tests based on the test configuration, wherein a number of the matching endpoint agents that are assigned the scheduled tests does not exceed the maximum number of endpoint agents that are to be selected for concurrently performing the scheduled tests, and wherein test results are based on the scheduled tests executed on each of the matching endpoint agents for monitoring network activity; and receiving uploaded results of the scheduled tests executed on the matching endpoint agents, wherein the uploaded results of the scheduled tests executed on the matching endpoint agents are processed for generating graphical visualizations and/or alerts of the monitored network activity.

13. The method of claim 12, wherein graphical visualizations of an application delivery state facilitate troubleshooting of network performance problems associated with one or more of the plurality of endpoint devices.

14. The method of claim 12, wherein each of the plurality of endpoint agents perform network monitoring tests and system monitoring tests.

15. The method of claim 12, wherein each of the plurality of endpoint agents are controlled by an agent controller.

16. The method of claim 12, wherein a plurality of tests that can be performed by the endpoint agents on the endpoint devices are configurable.

17. The method of claim 12, further comprising:

receiving another configuration input for setting a maximum number of tests assigned for a single endpoint agent.

18. A computer program product, the computer program product being embodied in a non-transitory computer readable storage medium and comprising computer instructions for:

receiving a test configuration for scheduled tests that includes a label for a set of conditions for dynamically selecting endpoint agents that match the set of conditions in the test configuration, wherein a plurality of endpoint agents are deployed to a plurality of endpoint devices;

receiving a configuration input for setting a maximum number of endpoint agents that are to be selected for concurrently performing the scheduled tests;

identifying one or more of the plurality of endpoint agents that match the label for the set of conditions in the test configuration, wherein each of the plurality of endpoint agents that match the label for the set of conditions in the test configuration is dynamically associated with the label based on a current network, a geography, an operating system (OS), a set of current state information, and/or other runtime/state information;

assigning the scheduled tests associated with the test configuration to the matching endpoint agents for execution of the scheduled tests based on the test configuration, wherein a number of the matching endpoint agents that are assigned the scheduled tests does not exceed the maximum number of endpoint agents that are to be selected for concurrently performing the scheduled tests, and wherein test results are based on the scheduled tests executed on each of the matching endpoint agents for monitoring network activity; and receiving uploaded results of the scheduled tests executed on the matching endpoint agents, wherein the uploaded results of the scheduled tests executed on the matching endpoint agents are processed for generating graphical visualizations and/or alerts of the monitored network activity.

19. The computer program product recited in claim 18, wherein graphical visualizations of an application delivery state facilitate troubleshooting of network performance problems associated with one or more of the plurality of endpoint devices.

20. The computer program product recited in claim 18, wherein each of the plurality of endpoint agents perform network monitoring tests and system monitoring tests.

21. The computer program product recited in claim 18, wherein the scheduled tests that can be performed by the endpoint agents on the endpoint devices are configurable.

22. The computer program product recited in claim 18, wherein each of the plurality of endpoint agents is controlled by an agent controller.

23. The computer program product recited in claim 18, further comprising computer instructions for:

receiving another configuration input for setting a maximum number of tests assigned for a single endpoint agent.

* * * * *